(12) United States Patent
Osborne

(10) Patent No.: US 12,147,856 B1
(45) Date of Patent: Nov. 19, 2024

(54) METHODS AND SYSTEMS FOR COMPUTING

(71) Applicant: Glenn William Osborne, Milton, GA (US)

(72) Inventor: Glenn William Osborne, Milton, GA (US)

( * ) Notice: Subject to any disclaimer, the term of this patent is extended or adjusted under 35 U.S.C. 154(b) by 42 days.

(21) Appl. No.: 18/183,556

(22) Filed: Mar. 14, 2023

Related U.S. Application Data

(63) Continuation-in-part of application No. 18/172,746, filed on Feb. 22, 2023, now abandoned.

(60) Provisional application No. 63/268,375, filed on Feb. 23, 2022.

(51) Int. Cl.
  *G06F 9/54* (2006.01)
  *G06F 9/38* (2018.01)

(52) U.S. Cl.
  CPC ............ *G06F 9/546* (2013.01); *G06F 9/3871* (2013.01)

(58) Field of Classification Search
  CPC .............................. G06F 9/546; G06F 9/3871
  See application file for complete search history.

(56) References Cited

PUBLICATIONS

Ahman, D., & Pretnar, M. (2021). Asynchronous effects. Proceedings of the ACM on Programming Languages, 5(POPL), 1-28.
Agha, G. A. (1985). Actors: A model of concurrent computation in distributed systems. Massachusetts Inst of Tech Cambridge Artificial Intelligence Lab, 15 pages.
Bravo, M., Li, Z., Van Roy, P., & Meiklejohn, C. (Sep. 2014). Derflow: distributed deterministic dataflow programming for Erlang. In Proceedings of the Thirteenth ACM SIGPLAN workshop on Erlang (pp. 51-60).
Dijkstra, E. W. (1968). Letters to the editor: go to statement considered harmful. Communications of the ACM, 11(3), 147-148.
Kambona, K., Boix, E. G., & De Meuter, W. (2013, July). An evaluation of reactive programming and promises for structuring collaborative web applications. In Proceedings of the 7th Workshop on Dynamic Languages and Applications (pp. 1-9).
Lea, D. (2000, June). A java fork/join framework. In Proceedings of the ACM 2000 conference on Java Grande (pp. 36-43).
Lee, E. A. (2006). The problem with threads. Computer, 39(5), 33-42.
Leger, P., Fukuda, H., & Figueroa, I. (2021). Continuations and Aspects to Tame Callback Hell on the Web. Journal of Universal Computer Science, 27(9), 955-978.
Mikkonen, T., & Taivalsaari, A. (2008, August). Web applications—spaghetti code for the 21st century. In 2008 Sixth international conference on software engineering research, management and applications (pp. 319-328). IEEE.
Nyman, L., & Laakso, M. (2016). Notes on the History of Fork and Join. IEEE Annals of the History of Computing, 38(3), 84-87.

(Continued)

*Primary Examiner* — Azizul Choudhury
(74) *Attorney, Agent, or Firm* — DLA Piper LLP (US); Lisa Norton

(57) ABSTRACT

Systems and methods for concurrently processing electronic messages are described. A suspendable machine for computing a selected electronic message can be invoked. The computing of the selected electronic message can be suspended in response to the controller receiving a communication from the suspendable machine that the suspendable machine requires one or more unbound private dataflow variables. The computing of the selected electronic message can be resumed in response to the controller selecting an electronic message that can bind at least one of the one or more unbound private dataflow variables.

14 Claims, 45 Drawing Sheets

(56) References Cited

PUBLICATIONS

Osborne, G., & Weninger, T. (Jun. 2016). Ozy: a general orchestration container. In 2016 IEEE International Conference on Web Services (ICWS) (pp. 609-616). IEEE.
Sutter, H. (2005). The free lunch is over: A fundamental turn toward concurrency in software. Dr. Dobb's journal, 30(3), 202-210.
Sutter, H., & Larus, J. (2005). Software and the Concurrency Revolution: Leveraging the full power of multicore processors demands new tools and new thinking from the software industry. Queue, 3(7), 54-62.
Van-Roy, P., & Haridi, S. (2004). Concepts, techniques, and models of computer programming. MIT press.
Wickham, H. (2011). The split-apply-combine strategy for data analysis. Journal of statistical software, 40(1), 1-29.
https://akka.io/—the home page for Akka, a toolkit for building concurrent, distributed, message passing applications. This website was accessed Jan. 16, 2022.
https://www.erlang.org/—the home page for Erlang, a programming language and middleware for building concurrent, distributed, message passing applications. This website was accessed Jan. 16, 2022.
https://docs.oracle.com/en/java/javase/11/docs/api/java.base/java/util/concurrent/CompletableFuture.html—the Java CompletableFuture object. This website was accessed Jan. 16, 2022.
J. Paul Morrison, "Flow-Based Programming", Mar. 2007, https://www.jpaulmorrison.com/fbp/fbp2.htm.
https://www.coursera.org/lecture/parallel-programming-in-java/phaser-examples-vs3XJ—Parallel Programming in Java; Data flow Synchronization and Pipelining using the Java Phaser class. This website was accessed Jan. 16, 2022.
https://en.wikipedia.org/wiki/Coupling_(computer_programming)—retrieved from internet archive, archived on Jan. 30, 2022.
https://en.wikipedia.org/wiki/Dataflow_programming—retrieved from internet archive, archived on Jan. 5, 2022.
https://en.wikipedia.org/wiki/Flow-based_programming—retrieved from internet archive, archied on Dec. 26, 2021.
https://en.wikipedia.org/wiki/Linda_(coordination_language)—retrieved from internet archive, archived on Nov. 23, 2021.
https://en.wikipedia.org/wiki/Service-oriented_architecture—retrieved from internet archive, archived on Jan. 13, 2022.

```
actor SimpleMathServiceWithCounters() in var Cell = import('system:Cell')

actor NumberService(N) in
        var Counter = Cell.new(N)
        respond get in
            @Counter
        end
        receive increment in
            Counter := @Counter + 1
        end
    end var OneRef = spawn(NumberService(1))
    var TwoRef = spawn(NumberService(1))
    var ThreeRef = spawn(NumberService(1))

respond calculate in
        // 7 = 1 + 2 * 3
        TwoRef.tell(increment)
        ThreeRef.tell(increment)
        ThreeRef.tell(increment)
        OneRef.ask(get) + TwoRef.ask(get) * ThreeRef.ask(get)
    end
end
```

601 — actor NumberService block
602 — spawn statements
603 — tell(increment) statements
604 — ask(get) calls

FIG. 6

```
interface Address {
} interface ActorRef {
    Address address();
    void send(Envelope envelope);
} interface Envelope {
    Object message();
    Object requestId();
    ActorRef requester();
} interface Control extends Envelope {
}
```

FIG. 8

```
class Machine {
    private Stack stack;
    private Stack current;
    private long computeCount;

public final ComputeAdvice compute(long timeSlice) {
        if (stack == null) {
            return ComputeEnd.SINGLETON;
        }
        long computeAllowed = computeCount + timeSlice;
        while (computeCount < computeAllowed) {
            computeCount++;
            current = stack;
            stack = stack.next;
            try {
                current.stmt.compute(current.env, this);
            } catch (WaitException wx) {
                stack = current;
                current = null;
                return new ComputeWait(wx.barrier());
            } catch (RaiseException rx) {
                unwindToNextCatchStmt(rx.error, rx);
            } catch (Throwable throwable) {
                unwindToNextCatchStmt(new JavaError(throwable), throwable);
            }
            if (stack == null) {
                return ComputeEnd.SINGLETON;
            }
        }
        return ComputePreempt.SINGLETON;
    }
}
```

FIG. 9

```
abstract class Machine {
    Stack stack;
    Stack current;
    long computeCount;
    abstract ComputeAdvice compute(long timeSlice);
} class Stack {
    Stmt stmt;
    Env env;
    Stack next;
} interface Env {
    Var get(Ident ident);
} interface Stmt {
    void compute(Env env, Machine machine) throws WaitException;
} class WaitVarException extends WaitException {
    private Var barrier;

public final Var barrier() {
        return barrier;
    }
}
```

FIG. 10

```
abstract class IfElseStmt implements Stmt {
    Ident x;
    Stmt consequent;
    Stmt alternate;
    public final void compute(Env env, Machine machine) throws WaitException {
        // Throw a WaitException if the variable at 'x' is unbound
        Value xRes = env.get(x).resolveValue();
        if (isTrue(xRes)) {
            pushStackEntry(machine, consequent, env);
        } else {
            pushStackEntry(machine, alternate, env);
        }
    }
}
```

FIG. 11

```java
package org.torqlang.local;

import org.torqlang.actor.ActorRef;
import org.torqlang.actor.Address;
import org.torqlang.actor.Envelope;
import org.torqlang.util.GetStackTrace;

import java.util.concurrent.Executor;
import java.util.concurrent.RejectedExecutionException;

import static org.torqlang.local.OnMessageResult.NOT_FINISHED;

public abstract class AbstractActor implements ActorRef {
    /*
    Concurrency invariants:
    *    1. All access to the mailbox value must be synchronized on mailboxLock
    *    2. All access to the state value must be synchronized on mailboxLock
    */ private final Address address;
    private final Executor executor;
    private final Dispatcher dispatcher = new Dispatcher();
    private final Logger logger;
    private final Mailbox mailbox;
    private final Object mailboxLock = new Object();
    private volatile State state = State.WAITING;
    protected AbstractActor(Address address, Mailbox mailbox, Executor executor, Logger logger) {
        this.address = address;
        this.mailbox = mailbox;
        this.executor = executor;
        this.logger = logger;
    }
    public final Address address() {
        return address;
    }
    protected boolean isExecutable(Mailbox mailbox) {
        return !mailbox.isEmpty();
    }
    protected final Logger logger() {
        return logger;
    }
    protected void logError(String message) {
        logger.error(address().toString(), message);
    }
    protected void logInfo(String message) {
        logger.info(address().toString(), message);
    }
```

FIG. 12B

```
protected abstract OnMessageResult onMessage(Envelope envelope);
protected void onReceivedAfterFailed(Envelope envelope) {
        logger.error(address.toString(), String.format("Message received after FAILED: %s", envelope));
}
protected void onReceivedAfterSuccessful(Envelope envelope) {
        logger.error(address.toString(), String.format("Message received after SUCCESSFUL: %s",
envelope));
}
protected void onRejectedByExecutor(RejectedExecutionException exc) {
        logger.error(address.toString(), String.format("Actor rejected by executor:\n%s",
                GetStackTrace.apply(exc, true)));
}
protected void onUnhandledError(Envelope envelope, Throwable throwable) {
        logger.error(address.toString(), String.format("Unhandled error while processing message:
                %s\n%s", envelope, GetStackTrace.apply(throwable, true)));   }
protected OnMessageResult onUnrecognizedMessage(Envelope envelope) {
        logger.error(address.toString(), String.format("Unrecognized message: %s", envelope));
        return NOT_FINISHED;
}
protected Envelope selectNext(Mailbox mailbox) {
        return mailbox.removeNext();
}
@Override
public final void send(Envelope envelope) {
        synchronized (mailboxLock) {
                if (state == State.FAILED) {
                        onReceivedAfterFailed(envelope);              1205
                        return;
                }
                if (state == State.SUCCESSFUL) {
                        onReceivedAfterSuccessful(envelope);
                        return;                                        1204
                }       mailbox.add(envelope);
// If we are ACTIVE, SCHEDULED, or WAITING (not executable), there is nothing to do. However, if we
// are WAITING (executable), we must schedule for execution.
                if (state == State.WAITING && isExecutable(mailbox)) {
                        dispatcher.schedule();    1202
                }
        }
}
public final State state() {
        synchronized (mailboxLock) {
                return state;
        }
}
public enum State {
1201            WAITING,    // actor is NOT executable (mailbox is empty or no selectable message in mailbox)
1202            SCHEDULED,  // actor is executable and actor is queued for execution
1203            ACTIVE,     // actor is currently processing a message (messages may arrive during processing)
1204            SUCCESSFUL, // actor finished normally and will no longer accept mail
1205            FAILED      // actor finished abnormally and will no longer accept mail
}
```

FIG. 12C

```
private final class Dispatcher implements AffinityRunnable {
    private volatile int workerIndex = -1;
    @Override
    public final void run() {
        // Because we have just been invoked by the executor, we know we are in the SCHEDULED state.
        Envelope next = null;
        try {
            synchronized (mailboxLock) {
                // A message can be selected because we were previously scheduled as "executable", and now we
                // are running. We must transition from SCHEDULED to ACTIVE as soon as we select a message from
                // the mailbox.
                next = selectNext(mailbox);
                state = State.ACTIVE;                                    1203
            }
            // CRITICAL: Do not synchronize on the mailboxLock during onMessage(). Releasing the lock allows
            // messages to be received while processing the current message.
            OnMessageResult result = onMessage(next);
            synchronized (mailboxLock) {
                if (result == OnMessageResult.FINISHED) {
                    state = State.SUCCESSFUL;                            1204
                    return;
                }
                // We just completed processing of a single message, and we are not finished. We must transition
                // from ACTIVE to either SCHEDULED or WAITING.
                if (isExecutable(mailbox)) {
                    schedule();
                } else {
                    state = State.WAITING;                               1201
                }
            }
        } catch (Throwable throwable) {
            synchronized (mailboxLock) {
                // We have just been interrupted by an unhandled error. We must transition from ACTIVE to FAILED.
                state = State.FAILED;                                    1205
                onUnhandledError(next, throwable);
            }
        }
    }
    /*
     * Must be called from within a "synchronized {...}" block     */
    private void schedule() {
        try {                                                            1202
            state = State.SCHEDULED;
            executor.execute(this);
        } catch (RejectedExecutionException exc) {
            state = State.FAILED;                                        1205
            onRejectedByExecutor(exc);
        }
    }
    @Override
    public final void setWorkerIndex(int workerIndex) {
        this.workerIndex = workerIndex;
    }
    @Override
    public final int workerIndex() {
        return workerIndex;
    }
}
```

FIG. 12D

```
package org.torqlang.klvm;
public final class Machine {
        private final Object owner;
        private Stack stack;
        private Stack current;
        private long computeCount;
        public Machine(Object owner, Stack stack) {
                this(owner, stack, 0);
        }
        public Machine(Object owner, Stack stack, long computeCount) {
                this.owner = owner;
                this.stack = stack;
                this.computeCount = computeCount;
        }
        public Machine(Stack stack) {
                this(null, stack, 0);
        }
        public Machine(Stack stack, long computeCount) {
                this(null, stack, computeCount);
        }
        public static void compute(Machine machine, long timeSlice) {
                ComputeAdvice advice = machine.compute(timeSlice);
                while (advice == ComputePreempt.SINGLETON) {
                        advice = machine.compute(timeSlice);
                }
                if (advice.isWait()) {
                        throw new IllegalStateException("Machine is waiting on a variable");
                }
                if (advice.isHalt()) {
                        throw new HaltException((ComputeHalt) advice);
                }
        }
}
```

FIG. 13B

```java
public final ComputeAdvice compute(long timeSlice) {
    if (stack == null) {
        return ComputeEnd.SINGLETON;
    }
    long computeAllowed = computeCount + timeSlice;
    while (computeCount < computeAllowed) {
        computeCount++;
        current = stack;
        stack = stack.next;
        try {
            current.stmt.compute(current.env, this);
        } catch (WaitException wx) {
            stack = current;
            current = null;
            return new ComputeWait(wx.barrier());
        } catch (NativeRaise nr) {
            RaiseStmt rs = new RaiseStmt(Stmt.ID_NOT_AVAIL, nr.error, nr, current.stmt);
            stack = new Stack(rs, current.env, current);
        } catch (FailedValueException fvx) {
            return new ComputeHalt(fvx.touchedFailedValue, current);
        } catch (UncaughtRaiseException urx) {
            return new ComputeHalt(urx.uncaughtRaise, current, urx.nativeCause);
        } catch (Throwable throwable) {
            Complete ne = new NativeError(throwable);
            RaiseStmt rs = new RaiseStmt(Stmt.ID_NOT_AVAIL, ne, throwable, current.stmt);
            stack = new Stack(rs, current.env, current);
        }
        if (stack == null) {
            return ComputeEnd.SINGLETON;
        }
    }
    return ComputePreempt.SINGLETON;
}
public final long computeCount() {
    return computeCount;
}
public final Stack current() {
    return current;
}
@SuppressWarnings("unchecked")   public final <T> T owner() {
    return (T) owner;
}
public final void pushStackEntries(StmtList stmtList, Env env) {
    for (StmtList.Entry current = stmtList.lastEntry(); current != null;
        current = current.prev()) {
        stack = new Stack(current.stmt(), env, stack);
    }
}
```

FIG. 13C

```
public final void pushStackEntry(Stmt stmt, Env env) {
    stack = new Stack(stmt, env, stack);
}
public final Stack stack() {
    return stack;
}
final void unwindToNextCatchStmt(Complete error, Throwable nativeCause)
        throws HaltException
{
    while (stack != null) {
        if (stack.stmt instanceof CatchStmt catchStmt) {
            Env catchEnv = Env.createPrivatelyForKlvm(stack.env,
                    new EnvEntry[]{new EnvEntry(catchStmt.arg, new Var(error))});
            stack = new Stack(catchStmt.caseStmt, catchEnv, stack.next);
            break;
        }
        stack = stack.next;
    }
    if (stack == null) {
        // INVARIANT: Even though we have unwound the stack, the field 'current' still holds the
        // instruction that raised the error.
        throw new UncaughtRaiseException(error, nativeCause);
    }
}
}
package org.torqlang.klvm;
public class Stack implements Kernel {
    public final Stmt stmt;
    public final Env env;
    public final Stack next;
    public final int size;
    public Stack(Stmt stmt, Env env, Stack next) {
        this.stmt = stmt;
        this.env = env;
        this.next = next;
        this.size = next == null ? 1 : next.size + 1;
    }
    @Override
    public final <T, R> R accept(KernelVisitor<T, R> visitor, T state) throws Exception {
        return visitor.visitStack(this, state);
    }
    @Override
    public final String toString() {
        return toDebugString();
    }
}
```

FIG. 13D

```
package org.torqlang.klvm;
import java.util.*;
/**
*An environment is a read-only mapping of identifiers to variables.
*/
public interface Env extends Kernel, Iterable<EnvEntry> {
        /**
        *Create an environment with the given parent environment and bindings, but if the parent environment is
        * the empty environment, use null in its place to remove a level of unnecessary indirection.
        */
        static Env create(Env parentEnv, Map<Ident, Var> bindings) {
                if (parentEnv == ArrayEnv.EMPTY_ENV) {
                        parentEnv = null;
                }
                if (bindings.isEmpty()) {
                        return parentEnv == null ? ArrayEnv.EMPTY_ENV : parentEnv;
                }
                return new ArrayEnv(parentEnv, bindings);
        }

/**
        * Create an environment with the given parent environment and bindings, but if the parent environment is
        * the empty environment, use null in its place to remove a level of unnecessary indirection.
        */
        static Env create(Env parentEnv, List<EnvEntry> bindings) {
                if (parentEnv == ArrayEnv.EMPTY_ENV) {
                        parentEnv = null;
                }
                if (bindings.isEmpty()) {
                        return parentEnv == null ? ArrayEnv.EMPTY_ENV :
                        parentEnv;
                }
                return new ArrayEnv(parentEnv, bindings);
        }
        static Env create(List<EnvEntry> bindings) {
                return new ArrayEnv(null, bindings);
        }
        /**
        * Create a root environment with the given bindings, but if the bindings are empty, return an empty
        * environment.
        */
        static Env create(Map<Ident, Var> bindings) {
                return bindings.isEmpty() ? ArrayEnv.EMPTY_ENV : new ArrayEnv(null, bindings);
        }
        static Env create(Env parentEnv, EnvEntry e1) {
                return new ArrayEnv(parentEnv, new EnvEntry[]{e1});
        }
        static Env create(Env parentEnv, EnvEntry e1, EnvEntry e2) {
                return new ArrayEnv(parentEnv, new EnvEntry[]{e1, e2});
        }
```

FIG. 13E

```
/**
*Create an Env with these exact parameters. This method is KLVM internal-use-only that avoids creating an extra
* collection instance when computing an Env for computing local statements, closures, and native statements.
*/
static Env createPrivatelyForKlvm(Env parentEnv, EnvEntry[] bindings) {
        return new ArrayEnv(parentEnv, bindings);
}
/**
* Return the empty environment (a private singleton).
*/
static Env emptyEnv() {
        return ArrayEnv.EMPTY_ENV;
}
static Env instanceForRestore(int size) {
        return new ArrayEnv(null, new EnvEntry[size]);
}
Env add(EnvEntry entry);

/**
*Collect the set of identifiers mapped to this variable. This method is used for debugging.
*/
void collectIdents(Var var, Set<Ident> collector);
boolean contains(Ident ident);
Var get(Ident ident);

/**
* Get the set of identifiers mapped to this variable. This method is used for debugging.
*/
Set<Ident> getIdents(Var var);
Env parentEnv();
Env rootEnv();

/**
* Return a copy of the current environment but extended with 'rootEnv'
*/
Env setRootEnv(Env rootEnv);
int size();
```

FIG. 13F

```
class ArrayEnv implements Env {
    private static final Env EMPTY_ENV = new ArrayEnv();
    private Env parentEnv;
    private EnvEntry[] bindings;
    private ArrayEnv() {
        parentEnv = null;
        bindings = new EnvEntry[0];
    }
    private ArrayEnv(Env parentEnv, EnvEntry[] bindings) {
        this.parentEnv = parentEnv;
        this.bindings = bindings;
    }
    private ArrayEnv(Env parentEnv, Map<Ident, Var> bindings) {
        this(parentEnv, makeBindingsArray(bindings));
    }
    private ArrayEnv(Env parentEnv, List<EnvEntry> bindings) {
        this(parentEnv, makeBindingsArray(bindings));
    }
    private static EnvEntry[] makeBindingsArray(List<EnvEntry> bindings) {
        EnvEntry[] answer = new EnvEntry[bindings.size()];
        for (int i = 0; i < bindings.size(); i++) {
            answer[i] = bindings.get(i);
        }        return answer;
    }
    private static EnvEntry[] makeBindingsArray(Map<Ident, Var> bindings) {
        EnvEntry[] answer = new EnvEntry[bindings.size()];
        int i = 0;
        for (Map.Entry<Ident, Var> e : bindings.entrySet()) {
            answer[i++] = new EnvEntry(e.getKey(), e.getValue());
        }
        return answer;
    }
    @Override
    public final <T, R> R accept(KernelVisitor<T, R> visitor, T state) throws Exception {
        return visitor.visitEnv(this, state);
    }
    /**
    * Return a new Env containing the old Env plus the new entry.
    */
    @Override
    public final Env add(EnvEntry entry) {
        for (EnvEntry e : bindings) {
            if (entry.ident.equals(e.ident)) {
                throw new IllegalArgumentException("Ident already exists in environment");
            }
        }
        EnvEntry[] newBindings = new EnvEntry[bindings.length + 1];
        System.arraycopy(bindings, 0, newBindings, 0, bindings.length);
        newBindings[bindings.length] = entry;
        return new ArrayEnv(parentEnv, newBindings);
    }
```

FIG. 13G

```java
@Override
public final void collectIdents(Var var, Set<Ident> collector) {
    for (EnvEntry envEntry : bindings) {
        if (envEntry.var.equals(var)) {
            collector.add(envEntry.ident);
        }
    }
    if (parentEnv != null) {
        parentEnv.collectIdents(var, collector);
    }
}
@Override
public final boolean contains(Ident ident) {
    for (EnvEntry envEntry : bindings) {
        if (envEntry.ident.equals(ident)) {
            return true;
        }
    }
    return parentEnv != null && parentEnv.contains(ident);
}
@Override
public final Var get(Ident ident) {
    for (EnvEntry envEntry : bindings) {
        if (envEntry.ident.equals(ident)) {
            return envEntry.var;
        }
    }
    return parentEnv == null ? null : parentEnv.get(ident);
}
@Override
public final Set<Ident> getIdents(Var var) {
    Set<Ident> collector = new HashSet<>();
    collectIdents(var, collector);
    return collector;
}
@Override
public final Iterator<EnvEntry> iterator() {
    return new DefaultEnvIterator();
}
@Override
public final Env parentEnv() {
    return parentEnv;
}
@Override
public final Env rootEnv() {
    return parentEnv == null ? this : parentEnv.rootEnv();
}
```

FIG. 13H

```java
@Override
public final Env setRootEnv(Env rootEnv) {
        if (parentEnv == null) {
                return new ArrayEnv(rootEnv, bindings);
        }
        return new ArrayEnv(parentEnv.setRootEnv(rootEnv), bindings);
}
@Override
public final int size() {
        return bindings.length;
}
@Override
public final String toString() {
        return toDebugString();
}
/*
 * We can use a simple iterator technique because environments are immutable.
 */
private class DefaultEnvIterator implements Iterator<EnvEntry> {
        private int next;
        private DefaultEnvIterator() {
        }
        @Override
        public final boolean hasNext() {
                return next < bindings.length;
        }
        @Override
        public final EnvEntry next() {
                if (next >= bindings.length) {
                        throw new NoSuchElementException("Next element is not present");
                }
                return bindings[next++];
        }
    }
}
}
```

FIG. 13I

Practical Language

```
actor HelloWorld() in
    actor TalkingActor() in
        respond areYouThere in
            "Hello World!"
        end
    end
    var _talkingActorRef = spawn(TalkingActor())
    respond perform in
        _talkingActorRef.ask(areYouThere)
    end
end
```

Kernel Language

```
HelloWorld = actor ($R) in // free vars: $UNHANDLED, $SPAWN, $RESPOND
    local TalkingActor, _talkingActorRef in
        TalkingActor = actor ($R) in // free vars: $RESPOND, $UNHANDLED
            $R = proc ($M) in // free vars: $RESPOND, $UNHANDLED
                case $M of areYouThere then
                    $RESPOND("Hello World!")
                else
                    $UNHANDLED($M)
                end
            end // CreateProcStmt
        end // CreateActorProcStmt
        local $V0 in
            TalkingActor($V0)
            $SPAWN($V0, _talkingActorRef)
        end
        $R = proc ($M) in // free vars: $UNHANDLED, _talkingActorRef, $RESPOND
            case $M of perform then
                local $V1 in
                    local $V2 in
                        $V2 = _talkingActorRef.ask
                        $V2(areYouThere, $V1)
                    end
                    $RESPOND($V1)
                end
            else
                $UNHANDLED($M)
            end
        end // CreateProcStmt
    end
end // CreateActorProcStmt
```

FIG. 14

Practical Language

```
actor NestedMathActs() in
  respond calculate in
    local A, B, C, D in
      A = set B + C + act D + 11 end
      C = set B + D end
      D = set 5 end
      B = 7
      A // Should be 35
    end
  end
end
```

Kernel Language

```
NestedMathActs = actor ($R) in // free vars: $RESPOND, $UNHANDLED, $ACT
  $R = proc ($M) in // free vars: $RESPOND, $UNHANDLED, $ACT
    case $M of calculate then
      local $V0 in
        local A, B, C, D in
          $ACT(
            local $V1, $V2 in
              $V1 = B + C
              $ACT($V2 = D + 11)
              A = $V1 + $V2
            end
          )
          $ACT(C = B + D)
          $ACT(D = 5)
          B = 7
          A = $V0
        end
        $RESPOND($V0)
      end
    else
      $UNHANDLED($M)
    end
  end // CreateProcStmt
end // CreateActorProcStmt
```

FIG. 15A

Parent Actor

```
NestedMathActs = actor ($R) in // free vars: $RESPOND, $UNHANDLED, $ACT
  $R = proc ($M) in // free vars: $RESPOND, $UNHANDLED, $ACT
    case $M of calculate then
      local $V0 in
        local A, B, C, D in
          A = // $RESPOND(A) from child
          $ACT(C = B + D)
          $ACT(D = 5)
          B = 7
          A = $V0
        end
        $RESPOND($V0)
      end
    else
      $UNHANDLED($M)
    end
  end // CreateProcStmt
end // CreateActorProcStmt
```

Child Actor

```
// A is unbound and present in
// the child root environment
local $V1, $V2 in
  $V1 = B + C
  $ACT($V2 = D + 11)
  A = $V1 + $V2
  $RESPOND(A)
end
```

```
public List<CompleteRec> findAll(List<Str> customerIds) throws Exception {
    final ArrayList<CompleteRec> profiles = new ArrayList<>();
    for (Str customerId : customerIds) {
        // Get Customer: findCustomer(ID)
        CompleteRec findByOrderId = CompleteRecBuilder.builder()
            .setLabel("find")
            .addField("customerId", customerId)
            .build();
1601    FutureEnvelope customerFr = FutureEnvelope.request(CustomerDao.SINGLETON, findByOrderId);
        // Get Customer Orders: findLastTenOrders(customerId, ID)
        CompleteRec findLastTenOrders = CompleteRecBuilder.builder()
            .setLabel("findLastTenOrders")
            .addField("customerId", customerId)
            .build();
1602    FutureEnvelope lastTenOrdersFr = FutureEnvelope.request(CustomerOrderDao.SINGLETON, findLastTenOrders);
        // Get Customer Invoices: findSixMonthInvoiceHistory(customerId, ID)
        CompleteRec findSixMonthInvoiceHistory = CompleteRecBuilder.builder()
            .setLabel("findSixMonthInvoiceHistory")
            .addField("customerId", customerId)
            .build();
1603    FutureEnvelope sixMonthHistoryFr = FutureEnvelope.request(CustomerInvoiceDao.SINGLETON, findSixMonthInvoiceHistory);
        CompletableFuture.allOf(customerFr.future(), lastTenOrdersFr.future(), sixMonthHistoryFr.future());
        CompleteRec customer = (CompleteRec) customerFr.future().get().message();
        CompleteTuple lastTenOrders = (CompleteTuple) lastTenOrdersFr.future().get().message();         1604
        CompleteTuple sixMonthsHistory = (CompleteTuple) sixMonthHistoryFr.future().get().message();
1605    profiles.add(CompleteRecBuilder.builder()
            .setLabel("customerProfile")
            .addField("customer", customer)
            .addField("lastTenOrders", lastTenOrders)
            .addField("sixMonthInvoiceHistory", sixMonthsHistory)
            .build()
        );
    }
    return profiles;  ◄──── 1606
}
```

FIG. 16

```java
public final class Var implements LiteralOrVar {
    private ValueOrVarSet valueOrVarSet;
    private Type type;
    private BindListener bindListener;
    private Var(ValueOrVarSet valueOrVarSet, Type type) {
        this.valueOrVarSet = valueOrVarSet;
        this.type = type;
    }
    public Var() {
        // An empty VarSet marks this Var as containing only itself
        this(VarSet.EMPTY_VAR_SET, AnyType.SINGLETON);
    }
    public Var(Value value) {
        this(value, AnyType.SINGLETON);
    }
    public Var(VarSet varSet) {
        this(varSet, AnyType.SINGLETON);
    }
    @Override
    public final <T, R> R accept(KernelVisitor<T, R> visitor, T state) throws Exception {
        return visitor.visitVar(this, state);
    }
    public final BindListener bindListener() {
        return bindListener;
    }
    @Override
    public final Value bindToValue(Value value, Set<Memo> memos) throws WaitVarException {
        if (value == null) {
            throw new NullPointerException("value");
        }
        // An empty VarSet marks this Var as containing only itself
        if (valueOrVarSet == VarSet.EMPTY_VAR_SET) {
            // Bind Value to a single Var location
            valueOrVarSet = value;
            if (bindListener != null) {
                bindListener.onBound(this, value);
            }
            return value;
        }
        if (valueOrVarSet instanceof VarSet thisVarSet) {
            // Bind Value to MULTIPLE Var locations (for each Var in VarSet)
            for (Var varElem : thisVarSet) {
                varElem.valueOrVarSet = value;
                if (varElem.bindListener != null) {
                    varElem.bindListener.onBound(this, value);
                }
            }
            return value;
        }
        // Bind Value to Value (unify a partial record or validate equality)
        valueOrVarSet = ((Value) valueOrVarSet).bindToValue(value, memos);
        return (Value) valueOrVarSet;
    }
}
```

FIG. 23A

```java
        @Override
        public final ValueOrVar bindToValueOrVar(ValueOrVar valueOrVar, Set<Memo> memos) throws
WaitVarException {
            return valueOrVar.bindToVar(this, memos);
        }
        @Override
        public final ValueOrVar bindToVar(Var other, Set<Memo> memos) throws WaitVarException {
            // Bind any combination involving a right-side Value
            if (other.valueOrVarSet instanceof Value otherValue) {
                Value unifiedValue = bindToValue(otherValue, memos);
                // CRITICAL: Unify equivalent arguments into just one argument in memory
                if (otherValue != unifiedValue) {
                    other.valueOrVarSet = unifiedValue;
                }
                return unifiedValue;
            }
            // We know the right-side is not a value, bind the left-side with a right-side Var or VarSet.
            if (valueOrVarSet instanceof Value thisValue) {
                Value unifiedValue = other.bindToValue(thisValue, memos);
                if (thisValue != unifiedValue) {
                    valueOrVarSet = unifiedValue;
                }
                return unifiedValue;
            }
            // We now know we must add a Var to a VarSet
            if (valueOrVarSet == VarSet.EMPTY_VAR_SET) {
                if (other.valueOrVarSet == VarSet.EMPTY_VAR_SET) {
                    VarSet pair = VarSet.createPrivatelyForKlvm(new Var[]{this, other}, 2);
                    this.valueOrVarSet = pair;
                    other.valueOrVarSet = pair;
                } else {
                    VarSet plusOne = ((VarSet) other.valueOrVarSet).add(this);
                    for (Var v : plusOne) {
                        v.valueOrVarSet = plusOne;
                    }
                }
            } else if (other.valueOrVarSet == VarSet.EMPTY_VAR_SET) {
                VarSet plusOne = ((VarSet) valueOrVarSet).add(other);
                for (Var v : plusOne) {
                    v.valueOrVarSet = plusOne;
                }
            } else {
                VarSet union = VarSet.union((VarSet) valueOrVarSet, (VarSet) other.valueOrVarSet);
                for (Var v : union) {
                    v.valueOrVarSet = union;
                }
            }
            return this;
        }
        @Override
        public final Complete checkComplete() throws WaitVarException {
            throw new WaitVarException(this);
        }
```

FIG. 23B

```
@Override
public final boolean entails(Value operand, Set<Memo> memos) throws WaitVarException {
        if (valueOrVarSet instanceof Value thisValue) {
                return thisValue.entails(operand, memos);
        }
        throw new WaitVarException(this);
}
@Override
public final boolean entailsValueOrIdent(ValueOrIdent operand, Env env) throws WaitVarException {
        return entailsValueOrVar(operand.resolveValueOrVar(env), null);
}
@Override
public final boolean entailsValueOrVar(ValueOrVar operand, Set<Memo> memos) throws WaitVarException {
        if (operand instanceof Var operandVar) {
                return entailsVar(operandVar, memos);
        }   return entails((Value) operand, memos);
}
private boolean entailsVar(Var operand, Set<Memo> memos) throws WaitVarException {
        /*
         * If x is in ES, and y is in ES, then return TRUE
         * Else if x is in ESx, and y is in ESy, then WAIT(x)
         * Else if x is in ESx, and y is determined, then WAIT(x)
         * Else if y is in ESy, and x is determined, then WAIT(y)
         */
        if (this == operand) {
                return true;
        }
        if (valueOrVarSet == VarSet.EMPTY_VAR_SET || operand.valueOrVarSet == VarSet.EMPTY_VAR_SET) {
                throw new WaitVarException(this);
        }
        if (valueOrVarSet == operand.valueOrVarSet) {
                return true;
        }
        if (operand.valueOrVarSet instanceof Value operandValue) {
                return entails(operandValue, memos);
        }
        if (valueOrVarSet instanceof Value thisValue) {
                return operand.entails(thisValue, memos);
        }
        throw new WaitVarException(this);
}
```

FIG. 23C

```
@Override
public final Value resolveValue() throws WaitVarException {
        if (valueOrVarSet instanceof Value thisValue) {
                return thisValue;
        }
        throw new WaitVarException(this);
}

@Override
public final ValueOrVar resolveValueOrVar() {
        return (valueOrVarSet instanceof Value thisValue) ? thisValue : this;
}
public final void restoreValue(Value value) {
        valueOrVarSet = value;
}
public final void restoreVarSet(VarSet varSet) {
        valueOrVarSet = varSet;
}
public final void setBindListener(BindListener bindListener) {
        this.bindListener = bindListener;
}

@Override
public final String toString() {
        return toDebugString();
}
public final Type type() {
        return type;
}
public final ValueOrVarSet valueOrVarSet() {
return this.valueOrVarSet;
        }
    }
```

FIG. 23D

```
package org.torqlang.klvm;

import org.torqlang.util.SourceSpan;

import java.util.Collection;
import java.util.HashSet;
import java.util.Set;

public final class IfElseStmt extends AbstractStmt { public final CompleteOrIdent x;
    public final Stmt consequent;
    public final Stmt alternate;

public IfElseStmt(int id, CompleteOrIdent x, Stmt consequent, Stmt alternate, SourceSpan sourceSpan) {
        super(id, sourceSpan);
        this.x = x;
        this.consequent = consequent;
        this.alternate = alternate;
    }

@Override
    public final <T, R> R accept(KernelVisitor<T, R> visitor, T state)
        throws Exception
    {
        return visitor.visitIfElseStmt(this, state);
    }

@Override
    public final void captureLexicallyFree(Set<Ident> knownBound, Set<Ident> lexicallyFree) {
        CompleteOrIdent.captureLexicallyFree(x, knownBound, lexicallyFree);
        // Copy knownBound to hide out-of-scope identifiers from the alternate statement
        consequent.captureLexicallyFree(new HashSet<>(knownBound), lexicallyFree);
        // No need to copy knownBound since there are no more peer statements
        alternate.captureLexicallyFree(knownBound, lexicallyFree);
    }

@Override
    public final void collectJumpStmts(Collection<? super JumpStmt> collector) {
        consequent.collectJumpStmts(collector);
        alternate.collectJumpStmts(collector);
    }

@Override
    public final void collectReturnStmts(Collection<? super ReturnStmt> collector) {
        consequent.collectReturnStmts(collector);
        alternate.collectReturnStmts(collector);
    }
```

FIG. 24A

```java
    @Override
    public final void compute(Env env, Machine machine) throws WaitException {
      Value xRes = x.resolveValue(env);
      if (!(xRes instanceof Bool bool)) {
        throw new IfElseCondNotABoolValue(xRes, this);
      }
      if (bool.value) {
        machine.pushStackEntry(consequent, env);
      } else {
        machine.pushStackEntry(alternate, env);
      }
    }

} package org.torqlang.klvm;

import org.torqlang.util.SourceSpan;

import java.util.*;

public interface Stmt extends DeclOrStmt, SourceSpan { int ID_NOT_AVAIL = -1;

static void captureLexicallyFree(StmtList stmts, Set<Ident> knownBound, Set<Ident> lexicallyFree) {
    for (StmtList.Entry current = stmts.firstEntry(); current != null; current = current.next()) {
      // Reset knownBound for each peer statement
      current.stmt().captureLexicallyFree(new HashSet<>(knownBound), lexicallyFree);
    }
  } default Collection<JumpStmt> collectJumpStmts() {
    List<JumpStmt> collector = new ArrayList<>(5);
    collectJumpStmts(collector);
    return collector;
  } default void collectJumpStmts(Collection<? super JumpStmt> collector) {
  } default Collection<ReturnStmt> collectReturnStmts() {
    List<ReturnStmt> collector = new ArrayList<>(5);
    collectReturnStmts(collector);
    return collector;
  }
```

FIG. 24B

```
  default void collectReturnStmts(Collection<? super ReturnStmt> collector) {
  }
  void compute(Env env, Machine machine) throws WaitException;
  int id();
  void pushStackEntries(Machine machine, Env env);
} package org.torqlang.klvm;
import org.torqlang.util.SourceSpan;
import java.util.Set;

public abstract class AbstractStmt implements Stmt {
  public final int id;
  public final SourceSpan sourceSpan;

public AbstractStmt(int id, SourceSpan sourceSpan) {
    this.id = id;
    this.sourceSpan = sourceSpan;
  }

@Override
  public final int begin() {
    return sourceSpan.begin();
  }

@Override
  public abstract void captureLexicallyFree(Set<Ident> knownBound, Set<Ident> lexicallyFree);

@Override
  public final int end() {
    return sourceSpan.end();
  }

@Override
  public final int id() {
    return id;
  }

@Override
  public void pushStackEntries(Machine machine, Env env) {
    machine.pushStackEntry(this, env);
  }

@Override
  public final String source() {
    return sourceSpan.source();
  }
```

FIG. 24C

```
@Override
  public final SourceSpan toSourceSpanBegin() {
    return sourceSpan.toSourceSpanBegin();
  }

@Override
  public final SourceSpan toSourceSpanEnd() {
    return sourceSpan.toSourceSpanEnd();
  }

@Override
  public final String toString() {
    return toDebugString();
  }

```java
public final class Bool implements Literal { public static final Bool FALSE = new Bool(false);
    public static final Bool TRUE = new Bool(true);
    public final boolean value;
    private Bool(boolean value) {
        this.value = value;
    }

@Override
    public final String appendToString(String string) {
        return string + value;
    } public static Bool assertBool(Value value) {
        if (value.getClass() == Bool.class) { // Bool is final
            return (Bool) value;
        }
        throw new IllegalArgumentException("Argument must be a Bool");
    } public static Bool of(boolean value) {
        return value ? Bool.TRUE : Bool.FALSE;
    }

@Override
    public final <T, R> R accept(KernelVisitor<T, R> visitor, T state) throws Exception {
        return visitor.visitBool(this, state);
    }

@Override
    public final Bool greaterThan(Value operand) {
        return Bool.of(Boolean.compare(value, assertBool(operand).value) > 0);
    }

@Override
    public Bool greaterThanOrEqualTo(Value operand) {
        return Bool.of(Boolean.compare(value, assertBool(operand).value) >= 0);
    }

@Override
    public final int hashCode() {
        return Boolean.hashCode(value);
    }

@Override
    public final boolean isValidKey() {
        return true;
    }
```

FIG. 25A

```
@Override
public Bool lessThan(Value operand) {
    return Bool.of(Boolean.compare(value, assertBool(operand).value) < 0);
}

@Override
public Bool lessThanOrEqualTo(Value operand) {
    return Bool.of(Boolean.compare(value, assertBool(operand).value) <= 0);
}

@Override
public final Bool not() {
    return value ? Bool.FALSE : Bool.TRUE;
}

@Override
public final Boolean toNativeValue() {
    return value;
}

@Override
public final String toString() {
    return toDebugString();
}

METHODS AND SYSTEMS FOR COMPUTING

PRIORITY CLAIM

This application claims the benefit of U.S. Provisional Application Ser. No. 63/268,375, filed on Feb. 23, 2022, the contents of which are incorporated herein by reference in their entirety.

BRIEF DESCRIPTION OF THE DRAWINGS

FIG. 6 depicts an example program demonstrating the natural programming style of Actorflow while interacting with immutable messages in accordance with an embodiment.

FIG. 8 illustrates an example Envelope interface in accordance with an embodiment.

FIG. 9 illustrates an example computation loop in accordance with an embodiment.

FIG. 10 illustrates an example of a Machine type and its dependencies in accordance with an embodiment FIG. 11 depicts an example implementation of a semantic if-else statement in accordance with an embodiment.

FIGS. 12B-12D depict an example Controller implementation in accordance with an embodiment.

FIGS. 13B-13I depict an example Suspendable Machine implemented as a computation loop in accordance with an embodiment.

FIG. 14 depicts a "Hello World!" example as expressed in a language in accordance with an embodiment.

FIGS. 15A and 15B illustrate the support of an "act" expression in accordance with an embodiment.

FIGS. 16 and 17 compare and contrast two different example programs that implement an example scenario, one in Java and one in accordance with an embodiment.

FIGS. 23A-23D depict an example private dataflow variable implementation in accordance with an embodiment.

FIGS. 24A-24D depict an example semantic statement implementation in accordance with an embodiment.

FIGS. 25A-25B depict an example implementation of a value that can be bound to a private dataflow variable as a Boolean value in accordance with an embodiment.

DETAILED DESCRIPTION

Figure 1:
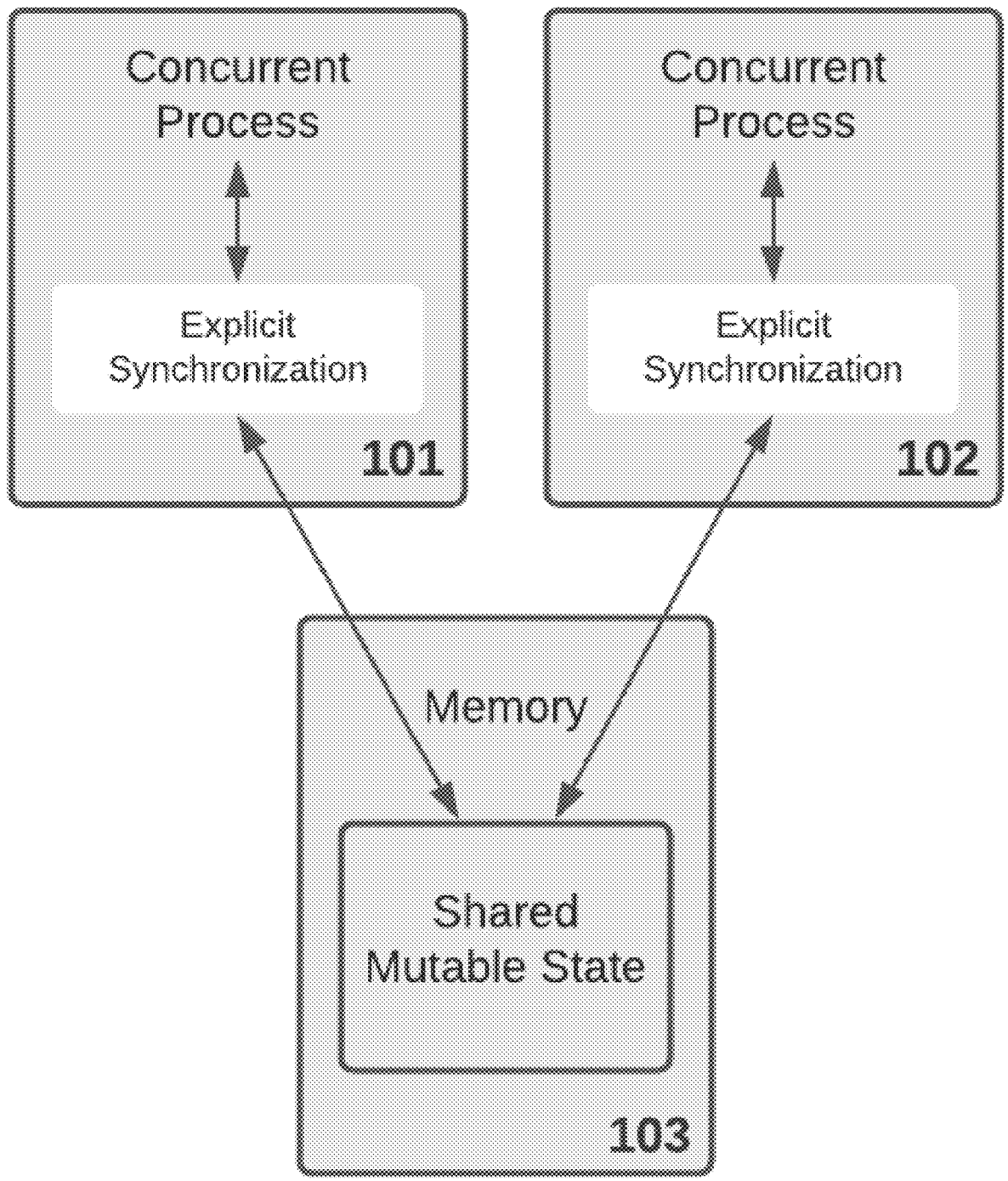
FIG. 1 illustrates the shared state model in accordance with an embodiment.

This disclosure is not limited to the particular systems, devices and methods described, as these may vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a." "an," and "the" include plural references, unless the context clearly dictates otherwise. Thus, for example, reference to a "cell" is a reference to one or more cells and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of."

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components as well as the range of values greater than or equal to 1 component and less than or equal to 3 components. Similarly, a group having 1-5 components refers to groups having 1, 2, 3, 4, or 5 components, as well as the range of values greater than or equal to 1 component and less than or equal to 5 components, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B. and C" would include but not be limited to systems that have A alone, B alone, C alone, A and B together, A and C together, B and C together, and/or A. B. and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

Cloud computing can utilize clusters of computers, and a computer may contain multiple processors. To exploit this inherent parallelism, programmers can use concurrent programming techniques. The methods disclosed herein may simplify concurrent programming for application programmers, which may allow them to utilize multiple processors more efficiently. In addition, methods disclosed herein may also increase concurrency.

A new programming language (e.g., Torq or Torqlang) is developed herein. However, many other known or new programming language syntaxes may be used instead to implement aspects of the disclosure.

Three example models of concurrent programming include shared state concurrency, message passage concurrency, and declarative dataflow concurrency. When discussing concurrent programming, we may refer to any concurrently executing entity as a concurrent process or thread. Sometimes, for reasons of clarity, we may refer to a concurrent process using a specific implementation. Some example implementations include a real process running within an operating system, a real thread running in a real process, a virtual thread running in a real process, and a green thread running in a real process.

FIG. 1 illustrates a shared state model in accordance with an embodiment. In the shared state model, programs can be written as concurrent, preemptive processes 101/102 using semaphores and/or monitors to synchronize access to shared memory 103. The shared memory 103 can be mutated by each concurrent process 101/102.

An object-oriented approach may require an object to encapsulate a semaphore with synchronized methods. Similarly, the functional approach may require a monad to encapsulate a semaphore with synchronized functions. Programming with shared state as a computation model may be flawed because it can be wildly nondeterministic. Object-oriented programming languages can help reduce nondeterminism by using class constructs that encapsulate shared state with synchronized operations. As a result, the techniques used in shared state concurrency can suffer from increased complexity that require a proxy object to synchronize concurrency Functional programming languages can help reduce nondeterminism by using purely functional constructs that minimize mutable state and side effects.

Figure 2:
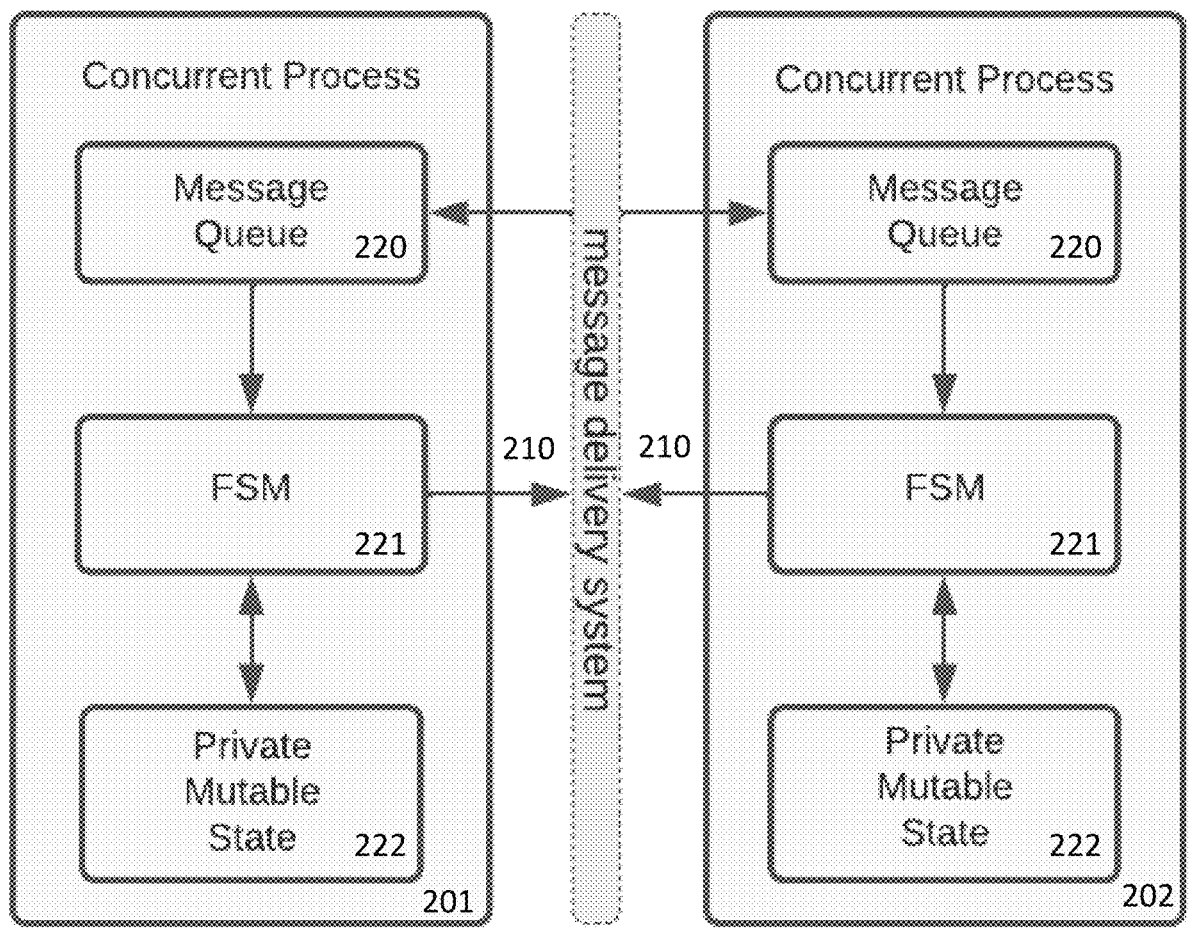
FIG. 2 illustrates the message passing model in accordance with an embodiment.

FIG. 2 illustrates a message passing model in accordance with an embodiment. In the message passing model, concurrent entities 201/202 called "processes" may interact by sending 210 immutable messages asynchronously without waiting for a reply. The sending process can rely on the receiving process to select a message and invoke a behavior. The received message can be stored in a message queue 220. When invoked, a behavior can perform computations on private mutable state 222, and when complete, can define a replacement behavior. Like a finite-state machine (FSM) 221, each concurrent process can manage its behaviors to help ensure that the correct behavior is waiting to accept a message and continue. Unfortunately, message passing implementations can devolve as complexity increases, becoming unnatural. A complex process can become fragmented and unnatural when it defines and coordinates multiple behavior objects while also performing a computation.

An example formal model for message passing concurrency is the Actor Model. Erlang and Akka are example actor implementations inspired by the actor model.

Figure 3:
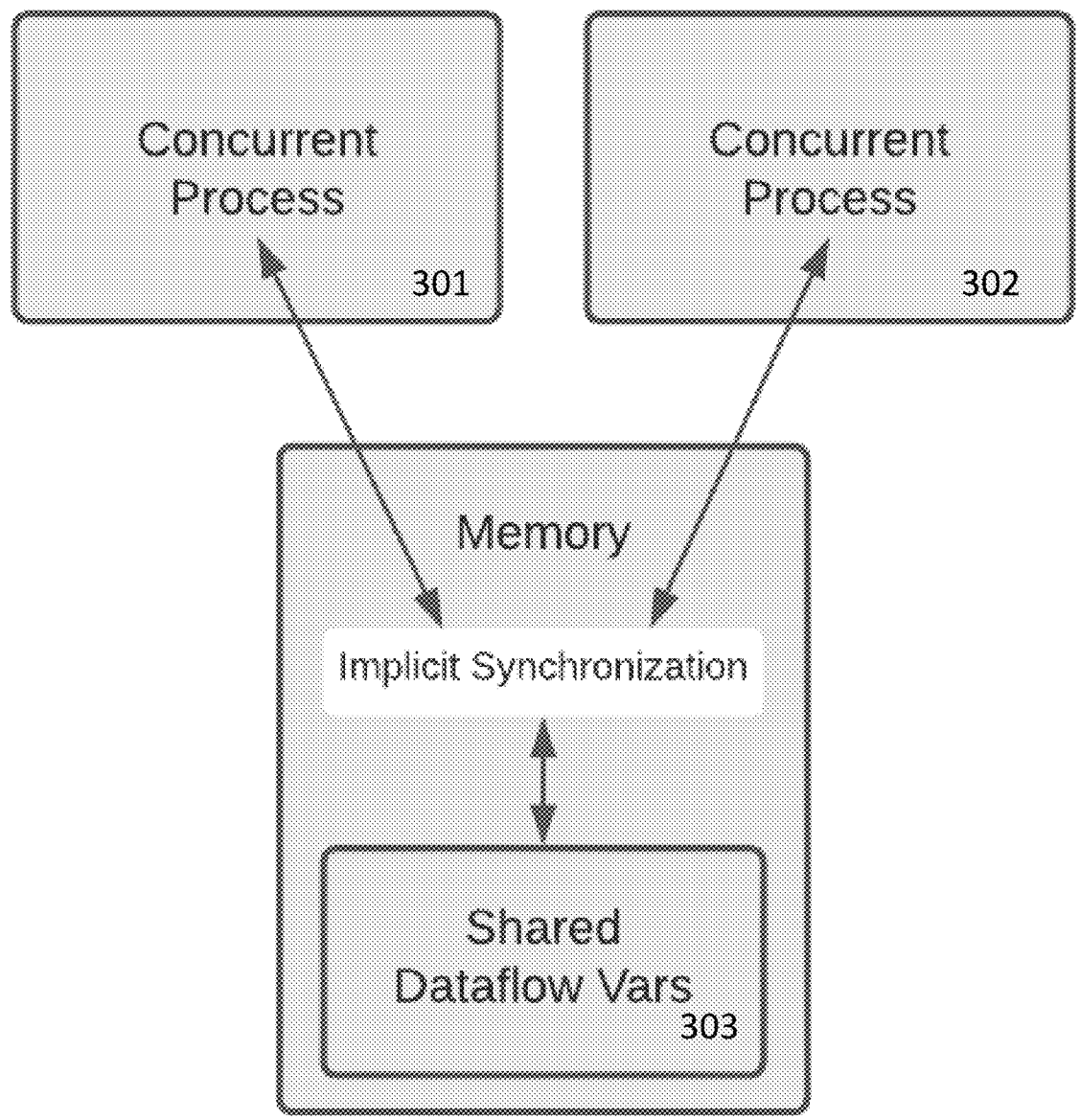
FIG. 3 illustrates the declarative dataflow model in accordance with an embodiment.

FIG. 3 illustrates the declarative dataflow model in accordance with an embodiment. The declarative dataflow model can be based on the single-assignment dataflow variable and its rules—a dataflow variable can either be bound or unbound, and once bound, a dataflow variable can be immutable. In declarative dataflow, multiple concurrent processes 301/302 can share a store of single-assignment dataflow variables 303. Processes that produce information can bind dataflow variables 303, and processes that consume information can suspend until dataflow variables 303 can be bound. The dataflow variable 303 and its rules can define the semantics that implicitly synchronize computation when one process binds a dataflow variable 303 that another process needs. Although declarative dataflow can be a natural approach to concurrent programming, it can also impose a significant restriction. Declarative dataflow may require all communicating processes to implicitly synchronize on a shared store of dataflow variables (e.g., not private), which can create a strong semantic coupling between processes.

There can be many approaches to dataflow programming. However, implicit synchronization can set declarative dataflow apart from the others, providing interleaving semantics and a natural programming style. Some example references related to dataflow are:

Dataflow Programming
Flow-based Programming
Linda Coordination Language
Java Phaser Spaghetti code can be a term for source code with a complex and tangled control structure. Modern non-blocking, asynchronous, and concurrent programs can use callbacks, Promises, async/await, and finite-state machines. The complex and tangled code that may be produced by these control structures is discussed in the following example references, which are incorporated by reference in their entireties:

Continuations and Aspects to Tame Callback Hell on the Web (Leger, P., Fukuda, H., & Figueroa, I., 2021)

Asynchronous effects (Ahman, D., & Pretnar, M., 2021)

An evaluation of reactive programming and promises for structuring collaborative web applications (Kambona, K., Boix, E. G., & De Meuter, W., 2013)

Web applications-spaghetti code for the 21st century (Mikkonen, T., & Taivalsaari, A., 2008, August)

In some aspects of the disclosure, the spaghetti code problem can be mitigated and/or solved by using a natural style for concurrent programming void of intrusive control structures. A natural programming style may have very little code for technical reasons unrelated to the application problem.

Figure 4:
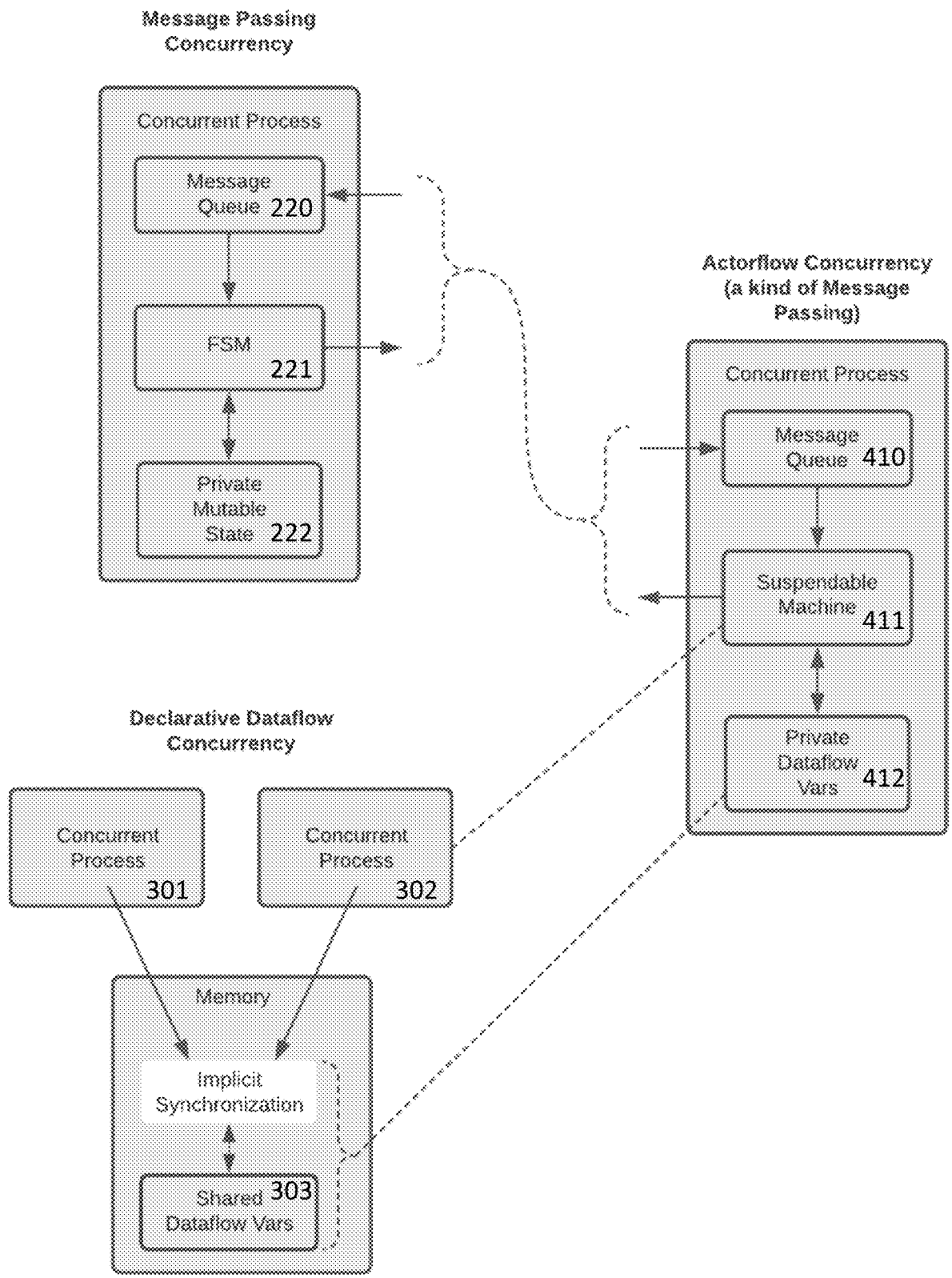
FIG. 4 illustrates the Actorflow model in accordance with an embodiment.

FIG. 4 illustrates an Actorflow model in accordance with an embodiment. Actorflow can be a model of concurrency that can combine the process interaction style from message passing with the natural programming style from declarative dataflow without strong semantic coupling between processes.

In a formal actor model, when an actor receives a message, it can concurrently send a finite number of messages to other actors, create a finite number of actors, and designate a behavior for the next message it receives Similarly, an Actorflow program can concurrently perform these three actions. However, in an Actorflow program, the third action may be "Suspend behavior while waiting for a message"-a suspension that can be caused by implicit synchronization while running a suspendable machine 411 over private dataflow variables 412, which can be exploited to create message passing languages that exhibit a natural programming style. The suspendable machine 411 can be implemented as a suspendable stack machine. In other embodiments, the suspendable machine 411 can be implemented as a tree. The tree may be configured (e.g., order of insertion and deletion) to function similarly to a stack. The concurrent process can include a message queue 410 of incoming messages.

Table 1 compares some aspects of Actorflow to the three example models of concurrency set forth above.

TABLE 1

|  | Message Style | Natural Style | Only Local State | Implicit Synchronization |
| --- | --- | --- | --- | --- |
| Shared State | No | No | No | No |
| Message Passing | Yes | No | Yes | No |
| Declarative Dataflow | No | Yes | No | Yes |
| Actorflow | Yes | Yes | Yes | Yes |

Message Style may require concurrent processes to interact only using immutable messages. Natural Style may use very little code just for technical reasons resulting in a sequential look-and-feel Only Local State may require processes use only a local state for preserving values between interactions. Implicit Synchronization may require that no constructs be necessary to wait on asynchronous responses.

As illustrated in Table 1, Actorflow can be a unique combination of the process interaction style from message passing with the natural programming style from declarative dataflow without strong semantic coupling.

Figure 5A:
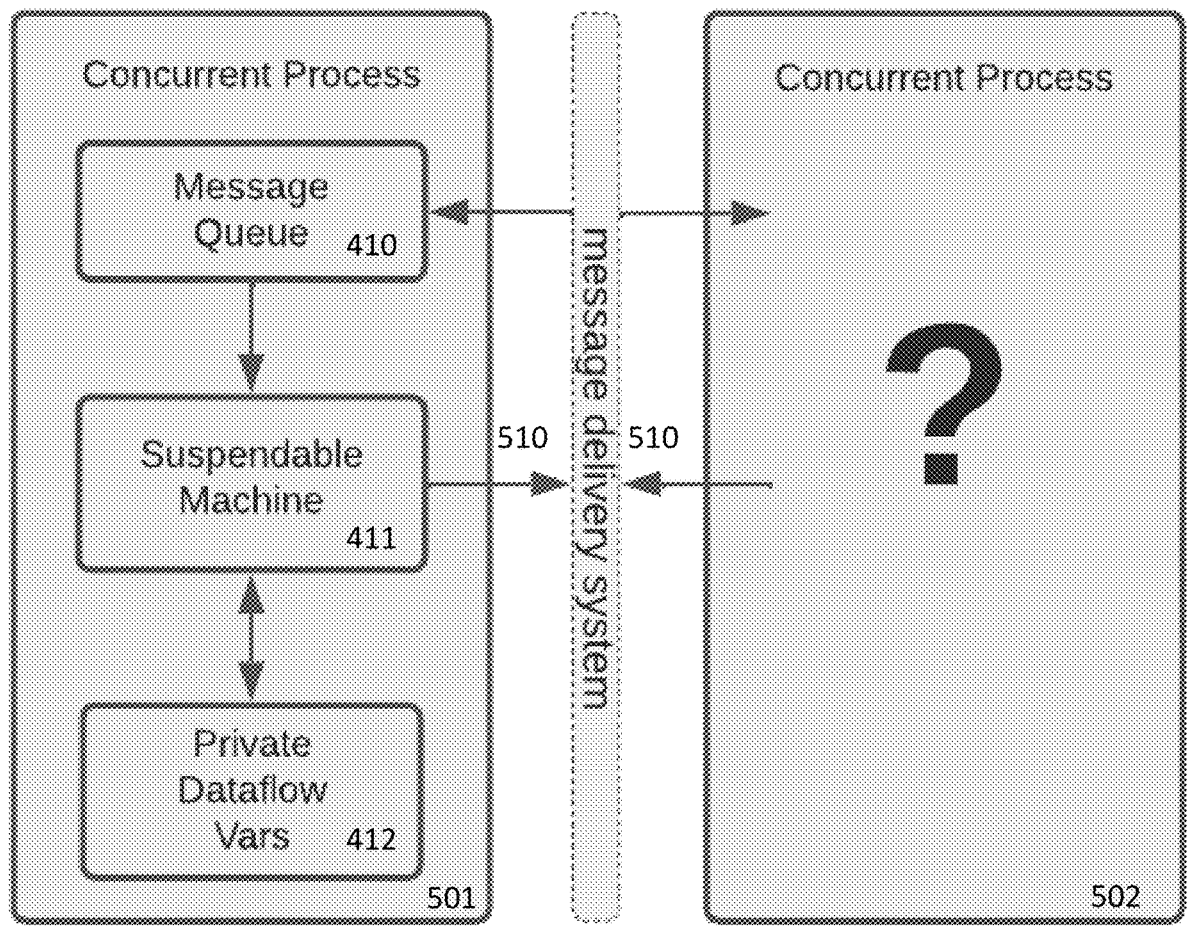
FIG. 5A illustrates the implicit synchronization, without strong semantic coupling of Actorflow, in accordance with an embodiment.

Declarative dataflow can require communicating processes to implicitly synchronize on a shared store of dataflow variables (e.g., not private)—and can create a strong semantic coupling between processes. Actorflow, on the other hand, may only use implicit synchronization over private dataflow variables-a hidden implementation concern that can avoid strong semantic coupling between processes. Because dataflow can be a hidden implementation concern, Actorflow can adapt and interoperate with actors implemented in other models. FIG. 5A illustrates the implicit synchronization of Actorflow in accordance with an embodiment. This can make Actorflow especially useful for orchestrating disparate components using simple message passing techniques.

Figure 5B:
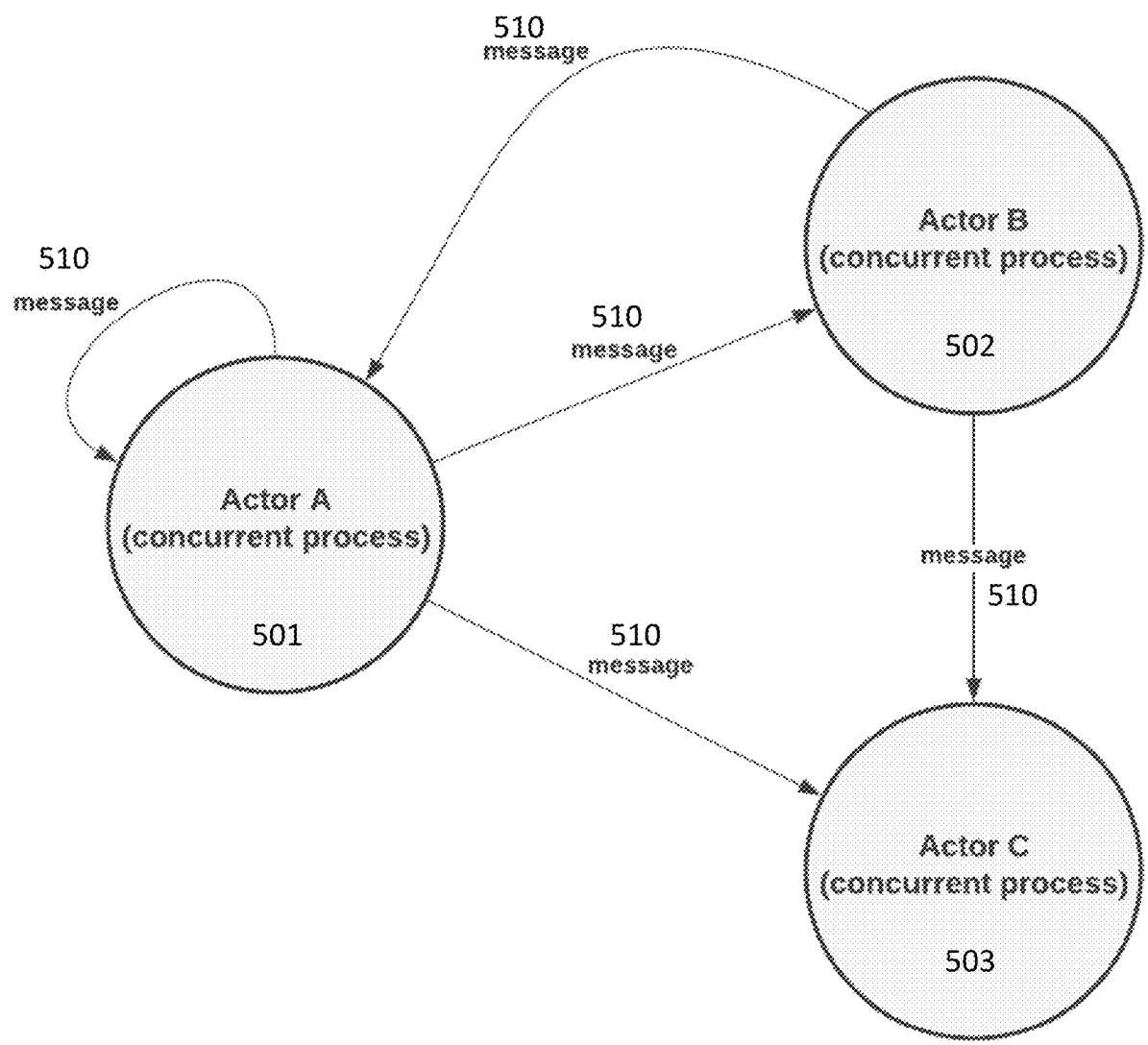
FIG. 5B illustrates a system of communicating actors running concurrently and communicating asynchronously, where some of the actors may be implemented as Actorflow, in accordance with an embodiment.

In some embodiments, an actor can participate in a system of many communicating actors 501/502. An actor can be a concurrent process 501/502 that can asynchronously send messages 510 to actors or spawn new actors. An actor 501/502 can be a client or server, such as a user agent or a web server. Example user agents include desktop GUIs, web browsers, mobile phones, tablets, web servers, serverless processors (e.g., AWS Lambda and Azure Function as a Service), workflow processors (e.g., AWS Step Functions and Azure Logic Apps), data pipelines (e.g., AWS Data Pipeline and Azure Data Factory), and Internet of Things (IoT) Devices. An actor 501/502 can be a sub-process, such as a thread, within a larger process, Therefore, an actor 501/502 can communicate by sending messages within or across processes. FIG. 5B illustrates a system of communicating actors 501/502/503 running concurrently and communicating 510 asynchronously, where some of the actors may be implemented as Actorflow, in accordance with an embodiment.

FIG. 6 depicts an example program demonstrating the natural programming style of Actorflow while interacting with immutable messages in accordance with an embodiment. This example consists of one example actor containing one declared actor. The example actor is SimpleMathServiceWithCounters, and it can declare the nested actor NumberService 601. During construction 602, the example actor can create and spawn three instances of NumberService: OneRef, TwoRef, and ThreeRef. All three instances can be initialized to 1. When the example actor receives a request to calculate, it can first increment TwoRef once and Three Ref twice 603. The example actor can then perform a simple math calculation, x+y*z 604, where x, y, and z are the values of OneRef, TwoRef, and ThreeRef after responding to the asynchronous get request, respectively.

Although the operations 602/603/604 can run concurrently, the program can be expressed in a natural programming style- and can be implicitly synchronized with very little code just for technical reasons. Even a math expression 604 can honor operator precedence, performing multiplication before addition. The first request to calculate can return the result of 1+(2*3), the second request to calculate can return the result of 1+(3*5), and each subsequent call can return a result after incrementing the factors accordingly. The behavior of the calculate method can demonstrate the preservation of local state (e.g., the factors) between interactions.

An actor construct can be characterized by any or any combination of the following example aspects:

An actor may be a concurrently executing entity (e.g., sometimes called a process).

An actor may be known to other actors only by its unforgeable address.

An actor may be only invoked by sending a message to its address.

An actor send may always be a one-way asynchronous communication.

An actor send may have no overhead, it may need to return immediately.

An actor message can contain addresses to other actors.

An actor message semantics may be independent of the sender.

An actor sender and receiver may be completely decoupled from the underlying communications.

An actor may place no restrictions on message delivery order.

An actor may receive messages into a mailbox while concurrently executing its behavior.

An actor mailbox may be backed by a FIFO queue.

An actor may encapsulate and hide suspendable behavior.

An actor behavior may not be required to process messages in FIFO order.

An actor may supply an API so a behavior may selectively remove a message from the mailbox.

An actor may supply an API so a behavior may create and spawn an actor.

An actor may supply an API so a behavior may send a message to an actor.

An actor may supply an API so a behavior may suspend with a replacement behavior.

Actors can organize behaviors as a collection of discrete pattern-matching functions.

An example actor implementation may organize behaviors as a collection of discrete pattern-matching functions where each pattern-match may proceed like a state transition within a finite-state machine (FSM). Initially, and in between processing messages, an actor may designate a pattern-matching function to wait for the next message. When an actor receives a message in its mailbox, it may use the waiting pattern-matching function to selectively remove a message from the mailbox for processing. The selected message may be passed to the state function associated with the pattern-match, thus transitioning to a new state within the finite-state machine. When a state function finishes processing a message, it may designate a replacement pattern-matching function to wait for the next message.

In Akka, the Behavior object may be used to select and process a message. When the Behavior object completes, it may return a replacement Behavior to wait for the next message.

In Erlang, the receive operation may be used to pattern match and select a message. When an Erlang receive operation completes, it may designate a new receive operation to wait for the next message.

An actor may be simple if it receives a message, performs local calculations, and returns a response. A simple actor can define just one pattern-matching function to perform its computation service. However, an actor may be complex if it receives a message, sends requests to other actors, suspends one or more times waiting for responses, performs calculations incrementally, and finally returns a response. A complex actor can coordinate multiple behaviors with pattern-matching functions while also performing a computation service. As complexity increases, an actor can devolve and model the concurrency problem instead of the application problem.

Figure 7:
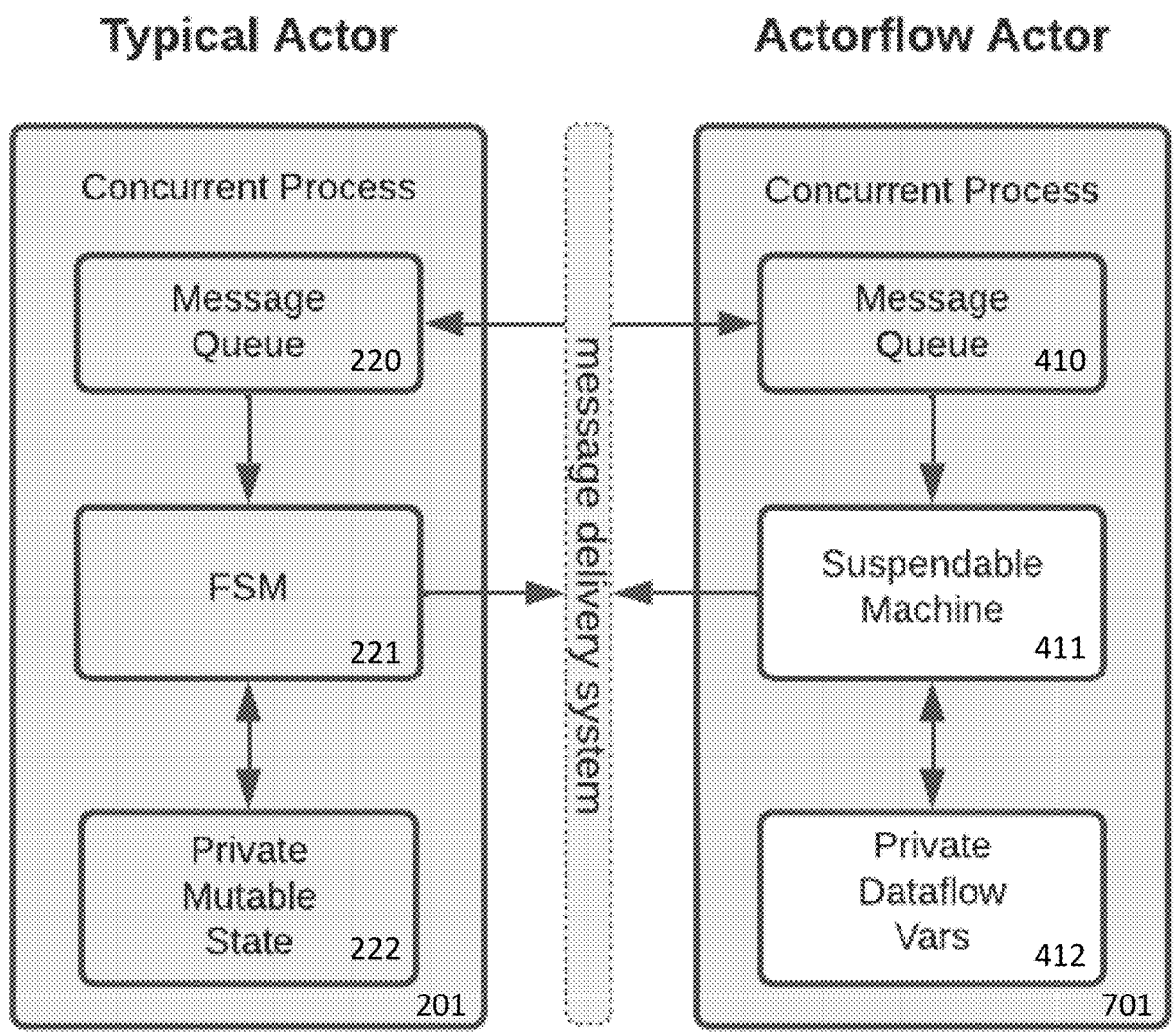
FIG. 7 illustrates how complex Actorflow actor can replace discrete pattern-matching functions and state functions with a suspendable machine over private dataflow variables in accordance with an embodiment.

As illustrated in FIG. 7, an Actorflow actor 701 can replace discrete pattern-matching functions and state functions with a suspendable machine 411 over private dataflow variables 412. As illustrated previously with the example code in FIG. 6, Actorflow can coordinate multiple asynchronous requests and responses while also performing a computation service with a sequential style that models the application problem. As complexity increases, an Actorflow actor 701 can model the application problem more clearly.

Even though Actorflow may greatly simplify programming actor behavior, the interface to the actor construct may be typical. FIG. 8, depicts an example, in accordance with an embodiment, where the interface to an actor may only require Java interface types. The Java interface types may include Address which may be an opaque and/or unforgeable reference to an actor, ActorRef which may be a construct that associates an Address with the ability to send messages in a way that can be completely decoupled from the underlying communications that send messages, Envelope which may be a data type that can contain a Notify. Request, and/or Response message depending on the properties provided in the envelope, and/or Control which may be a marker type that can be used to send an Envelope to the actor construct instead of its waiting behavior. For example, a Control envelope can contain a message to Stop or Debug an actor.

Actorflow may pass messages to a suspendable machine based on the message type in the Envelope. The message type in the Envelope may be determined by whether specific properties are present on the Envelope.

For example, in the following table, each row can correspond to a message type, and each column can specify, for the corresponding message type, whether an envelope property is required. Notice that each property column can correspond respectively to the methods message( ), requester( ), and request Id ( ) on the example Envelope interface in FIG. 8.

TABLE 2

|  | Message | Requester | Request Id |
| --- | --- | --- | --- |
| Notify | Yes | No | No |
| Request | Yes | Yes | Yes |
| Response | Yes | No | Yes |

Table 2 illustrates how envelope properties may determine message type. For example, in Table 2, each row can correspond to a message type, and each column can specify, for the corresponding message type, whether an envelope property is required.

A Suspendable Stack Machine can be a suspendable machine that can execute a kernel language over private dataflow variables. The suspendable machine may be based on the Oz Computation Model, but the store of single-assignment dataflow variables may not be shared, but rather be private. Otherwise, the suspendable machine can adhere to the semantics defined by the Oz Computation Model. Although a suspendable machine is referenced herein, a person of ordinary skill in the art will recognize that a suspendable machine using another data structure to track and execute instructions could be implemented. For example, a suspendable machine could be implemented using a tree structure with operations to push and pop tree nodes.

A dataflow variable can either be bound or unbound, and once bound, a dataflow variable can be immutable. If a behavior reads a dataflow variable that is unbound, it can suspend until the dataflow variable is bound. Once bound, the behavior can resume.

There can be suspendable statements and nonsuspendable statements. A suspendable statement may require at least one bound value for its computation. For example, consider the following if statement:

```
begin
   var X=10
   if X>=Y then Z=X else Z=Y end
end
```

The conditional X>=Y evaluates to true or false. If the conditional cannot evaluate because Y is unbound, then the behavior must suspend. If the actor receives a message later that causes Y to become bound, then the behavior can continue as if nothing interrupted the normal flow of execution. This can be described as dataflow behavior, and can be based on implicit synchronization, which can give us interleaving semantics and a natural programming style.

In a private store of dataflow variables a an actor can contain and manage exclusively a set of single-assignment dataflow variables. These variables can be partitioned into two sets: variables that are unbound and variables that are bound to values, such as records, numbers, and procedures.

An environment E can be a mapping from variable identifiers to entities (unbound variables and values) in the private store $\alpha$. We can write E as a set of pairs: (X→x, Y→y), where X, Y are identifiers and x, y refer to entities in the private store.

A semantic statement can be a pair (<s>, E) where <s> is a statement and E is an environment. The semantic statement can relate a statement to its references in the private store.

An execution state can be a pair (ST, $\sigma$) where ST may be a stack of semantic statements and a may be a private store. The stack and private store may be contained and managed exclusively by the same actor.

Computation can be a sequence of execution states starting from an initial state: $(ST_0, \sigma_0) \rightarrow (ST_1, \sigma_1) \rightarrow (ST_2, \sigma_2) \rightarrow \ldots$.

A computation step can be a single atomic transition in a computation. At each step, the first semantic statement of ST may be popped and computed according to the semantics of the statement.

An actor construct may be configured with aMessage Handling Statement and a root environment. The message handling statement can implement the actor interface. For example, the actor interface for SimpleMath ServiceWith Counters illustrated in FIG. 6 is the request handler calculate, and the interface for the declared actor NumberService is the request handler get and the notify handler increment. When an actor construct receives a message M, it may invoke a behavior. It may push an element (<s>, E) onto the semantic stack ST that can apply the message handling statement <s> to the message argument M with an environment E that may contain the root environment variables. It may also invoke the abstract machine to perform a computation starting at computation step $(ST_0, \sigma_0)$.

A semantic stack ST may be in one of the following runtime states:
Executable—ST can perform a computation step
Ended—ST is empty
Suspended—ST is not empty, but is waiting on a dataflow variable to become bound The root environment may contain callbacks allowing statements to communicate with the actor construct.

A computation step may compute a statement according to its semantic specification.

Some examples of suspendable statements include:
if statement—may conditionally execute code
case statement—may match a pattern and conditionally execute code
apply statement—may apply a procedure to a list of arguments Some examples of nonsuspendable statements:
may create a variable
may create a value
may assign an unbound variable to an unbound variable The language may be an example of a dynamic interpreted language hosted by the Java VM. Programs written in the language may be translated into a kernel language and may be executed by an interpreter as illustrated by the example computation loop in FIG. 9. The example kernel language interpreter may perform a computational loop based on the kernel stack machine of the Oz Computation Model, including the Oz definition of suspendable and nonsuspendable statements.

Each actor construct may contain a single Machine instance. An example of a Machine type and its dependencies are illustrated in FIG. 10.

As illustrated in FIG. 9, the computation loop may perform a series of computation steps where each step can pop the Stack into current and compute the Stint. The following example scenarios may cause the computation loop to communicate with the actor construct:
When the computation loop catches a Wait Exception, it may suspend by returning a ComputeWait with the waiting dataflow variable as its value.
When the computation loop completes its timeSlice, it may yield control by returning a singleton Compute Preempt.
When the computation loop receives an error, it may try to recover by searching for a matching catch statement while unwinding the Stack. If unsuccessful, it may throw a UncaughtRaiseException that may be caught by the actor construct.
When the Stack is empty (null), the computation loop may return a singleton ComputeEnd.

In response to communication from the computation loop, the actor construct may wait, continue, or finish. The actor construct can resume by invoking the computation loop with an initial execution state containing a message handling Stmt and an Env, which may contain at least the root environment variables.

FIG. 11 depicts an example implementation of a semantic if-else statement in accordance with and embodiment When the IfElseSttmt is invoked from the computation loop:
If the variable at x is unbound, env.get(x).resolveValue( ) can throw a WaitException causing the computation loop to suspend on the unbound variable.
If the variable at x is true, the semantic statement consequent can be pushed onto the Stack.
If the variable at x is false, the semantic statement alternate can be pushed onto the Stack.

Figure 12A:
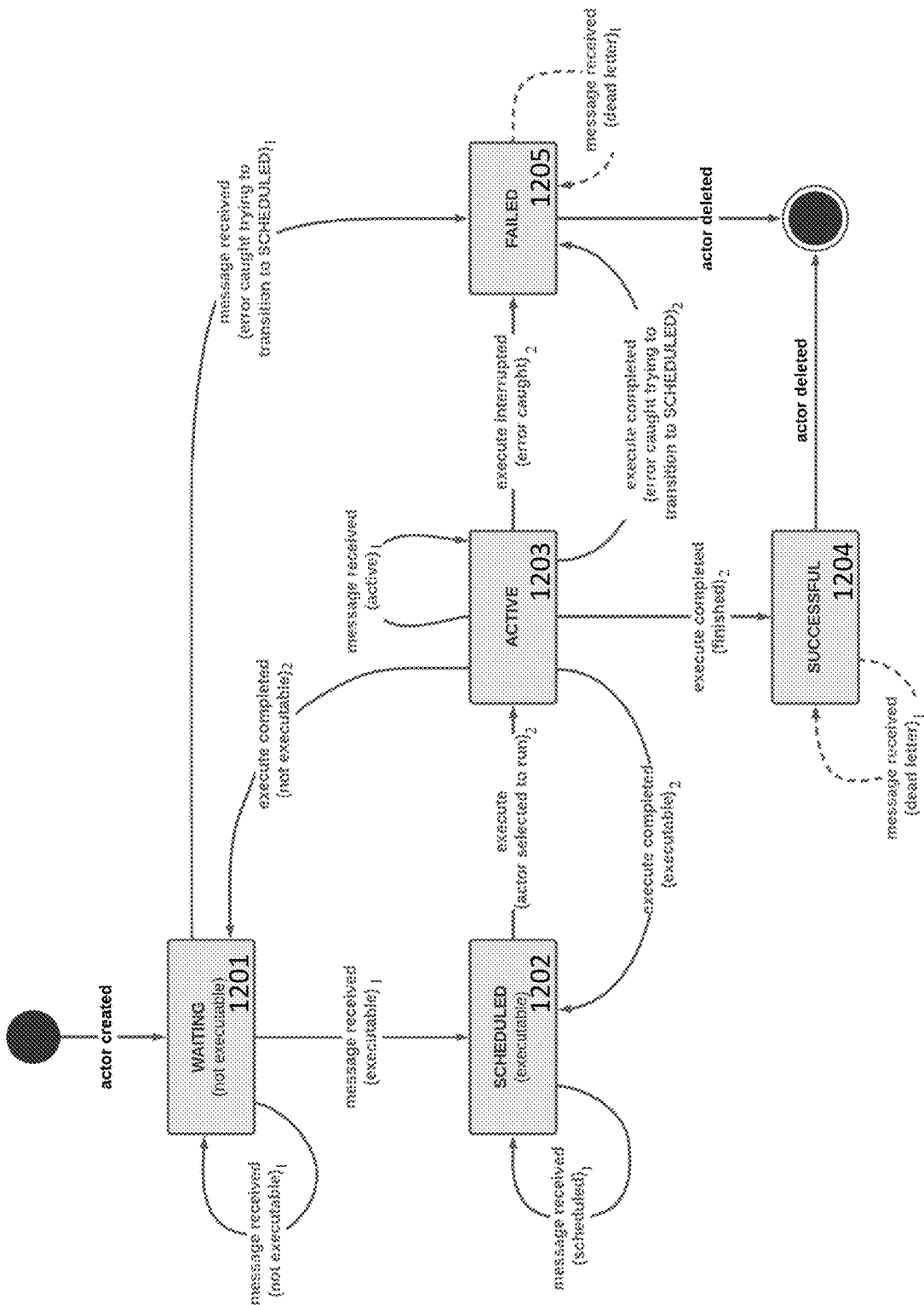
FIG. 12A depicts an example Controller process for an Actorflow embodiment.

As discussed previously, an actor may be a concurrent process that waits for a message and processes messages one at a time. FIG. 12A depicts an example Controller process for an Actorflow embodiment that can accept a message while in one of the following example states: WAITING 1201, SCHEDULED 1202, ACTIVE 1203, or FINISHED (SUCCESSFUL 1204 or FAILED 1205). An actor can receive a message concurrently while performing a computation. Any event name starting with "message received" may occur when a message is placed in the mailbox. Any event name annotated with "(executable)" may occur when an actor can select a message for processing. Events labeled with subscript 1 ("₁") are events which receive messages. Events labeled with subscript 2 ("₂") are events which occur in computation.

The following list contains example descriptions that can be used in some form for the example states and state transitions in FIG. 12A:

actor created—a constructor may have created an actor, and after initialization, the actor may transition to WAITING 1201.

WAITING 1201—the actor may exist on the memory heap and may not use any other resource—it may not be scheduled with an executor and may not use any CPU.

message received (executable)—the actor can now select a message for processing—the actor may be scheduled with an executor and transition from WAITING 1201 to SCHEDULED 1202.

message received (not executable)—the actor can receive a message, but the actor may not be able to select a message for processing. The actor may remain WAITING 1201.

message received (error caught trying to transition to SCHEDULED 1202)—the actor can now select a message for processing. However, the actor may have caught a system error trying to schedule with an executor. As a consequence, the actor may transition from WAITING 1201 to FAILED 1205.

SCHEDULED 1202—the actor can select a message for processing and may wait to use the CPU.

message received (scheduled)—the actor may have received a message while SCHEDULED 1202. The actor may remain SCHEDULED 1202.

execute (actor selected to run)—the actor can select a message for processing and may now use the CPU. The actor may transition from SCHEDULED 1202 to ACTIVE 1203.

ACTIVE 1203—the actor may now perform "An Actorflow Computing Process" as described below.

message received (active)—the actor may have received a message while already active. An active actor may not be blocking its mailbox, so the message can be added to the mailbox concurrently.

execute completed (executable)—the actor may have completed a time slice and can now select a message for processing. The actor may transition from ACTIVE 1203 to SCHEDULED 1202.

execute completed (not executable)—the actor may have completed a time slice and cannot select a message for processing. The actor may transition from ACTIVE 1203 to WAITING 1201.

execute completed (finished)—the actor may have completed its job. The actor may transition from ACTIVE 1203 to SUCCESSFUL 1204.

execute interrupted (error caught)—the actor may have caught an error and did not complete its time slice. As a consequence, the actor may transition from ACTIVE 1203 to FAILED 1205.

execute completed (error caught trying to transition to SCHEDULED 1202)—the actor may have completed a time slice and can now select a message for processing. However, the actor may have caught a error trying to schedule with an executor. As a consequence, the actor may transition from ACTIVE 1203 to FAILED 1205.

SUCCESSFUL 1204—the actor may have finished successfully.

FAILED 1205—the actor may have finished in error.

message received (e.g., dead letter)—the actor may have received a message while finished (SUCCESSFUL 1204 or FAILED 1205). The message may be a "dead letter" and may not be processed.

actor deleted—the actor may have been reclaimed by the garbage collector and no longer exists.

As discussed previously regarding FIG. 12A, an actor can transition from SCHEDULED 1202 to ACTIVE 1203 on the execute (actor selected to run) event because the actor can select a message for processing. FIGS. 12B-12D depict an example Controller implementation in accordance with an embodiment.

Figure 13A:
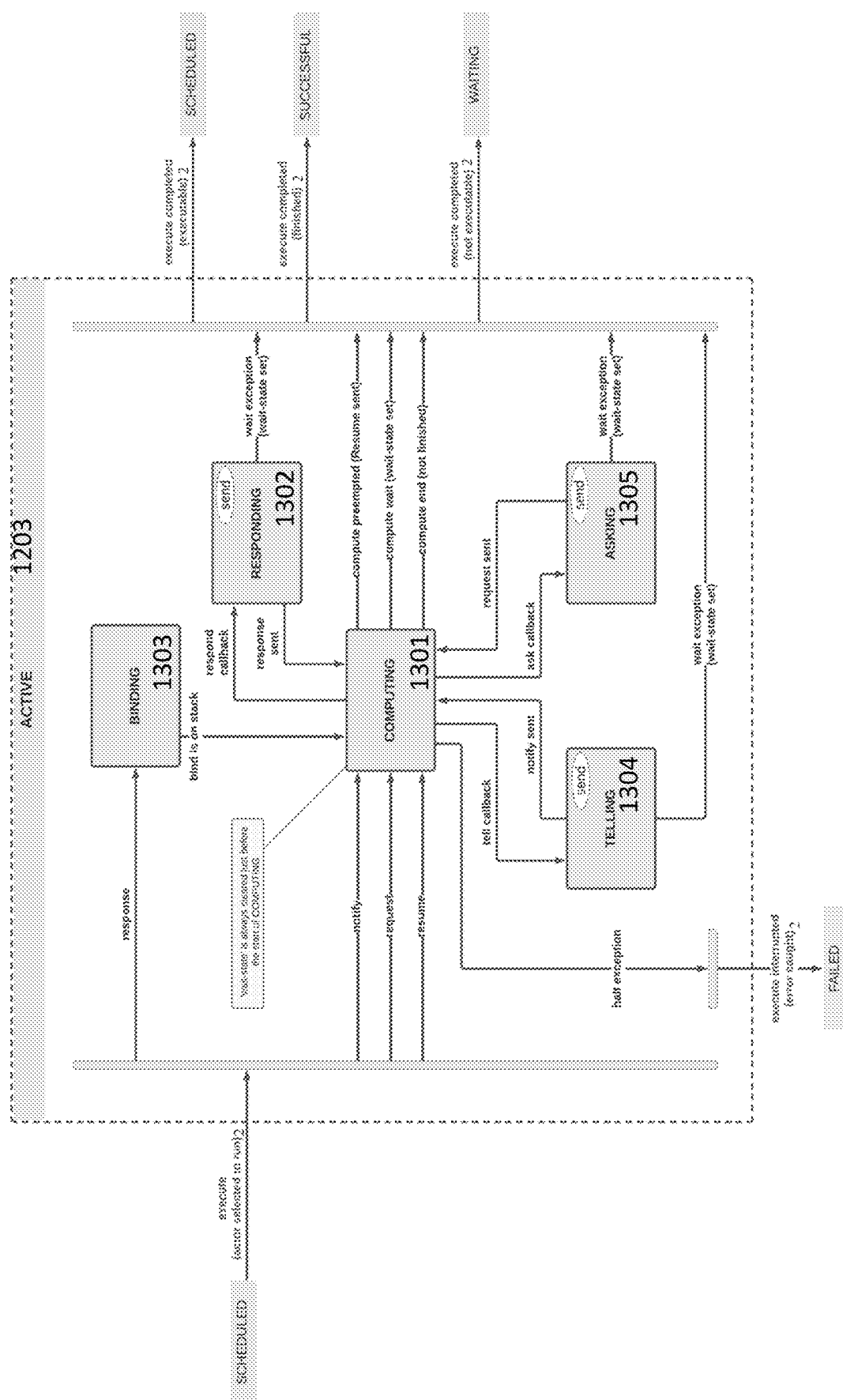
FIG. 13A illustrates an example ACTIVE state that can process Notify, Request, Response, and Resume messages in accordance with an embodiment.

FIG. 13A illustrates an example ACTIVE 1203 state that can process Notify, Request, Response, and Resume messages in accordance with an embodiment.

The example in FIG. 13A can maintain two state variables:

active-request—set if a request message is being processed, otherwise clear wait-state—set if suspended on a dataflow variable, otherwise clear The example in FIG. 13A can select Control messages before any other message and Response messages before Notify or Request.

The example in FIG. 13A can be executable if:

The actor is waiting on a Response to fulfill a dataflow variable (wait-state is set), and the mailbox contains a Control or Response.

The actor is not waiting on a Response, and a message is present in the mailbox.

The following list contains example descriptions for the example states and state transitions in FIG. 13A:

notify—the actor may have selected a Notify message. Consequently, the actor may push a semantic statement onto the semantic stack and transition to COMPUTING 1301. Consider the example in FIG. 6 that sends increment to instances of NumberService. The actor implementation for NumberService can compute an increment by pushing a semantic statement onto the semantic stack that can perform the increment handler in the program from the computational loop.

request—the actor may have selected a Request message. Consequently, the actor may set the 'active-request' variable to the request envelope, push a semantic statement onto the semantic stack, and transition to COMPUTING 1301. Later, the RESPONDING 1302 state may use 'active-request' to retrieve the destination for the response. As an example of a Request message, the example in FIG. 6 sends get to instances of NumberService.

response—the actor may have selected a Response message. Consequently, the actor may transition to BINDING 1303.

resume—the actor may have selected a Resume message, which is a type of Control message. The actor may transition to COMPUTING 1301.

COMPUTING 1301—the actor may clear the 'wait-state' variable and execute the computational loop illustrated in FIG. 9.

compute preempted (Resume sent)—the computational loop may have computed the number of statements allowed. The actor may now send a Resume message to self and transition to SCHEDULED 1202 or WAITING 1201 depending on whether it is executable.

compute wait (wait-state set)—the computational loop may have received a WaitException. The actor may now set its 'wait-state' and transition to SCHEDULED 1202 or WAITING 1201 depending on whether it is executable.

compute end—the computational loop may have reduced its semantic stack to null.

The actor may transition to SCHEDULED 1202 or WAITING 1201 depending on whether it is executable.

halt exception—the actor may have received an error while COMPUTING 1301. The actor may use 'active-request' to respond with a FailedValue. The actor may transition to FAILED 1205.

BINDING 1303—the actor may push a semantic statement onto the semantic stack to bind the value for each collected Response message and transition to COMPUTING.

RESPONDING 1302—the actor may be at the final step of COMPUTING 1301 a Request message, and the computational loop is making a callback. The actor may ensure that the response message is complete and immutable (see wait exception). The actor may use 'active-request' to send a Response to the destination, clear 'active-request', and transition back to COMPUTING 1301.

TELLING 1304—the actor may be sending a Notify to another actor. The actor may ensure that the message is complete and immutable (see wait exception). The actor may send a Notify message to the actor reference and transition back to COMPUTING 1301.

ASKING 1305—the actor may be sending a Request to another actor. The actor may ensure that the message is complete and immutable (see wait exception). The actor may send a Request message to the actor reference and transition back to COMPUTING 1301.

wait exception—the actor may have received a WaitException during RESPONDING 1302, TELLING 1304, or ASKING 1305. Only complete and immutable messages may be sent to actors. If an actor tries to send a partial value as a message, the actor may receive a WaitException, set 'wait-state', and transition to WAITING 1201 until responses arrive that complete the message. If the programmer tries to send a mutable message that can never be complete, the actor may throw a halt exception and transition to FAILED 1205.

Errors may be propagated as FailedValue. When a requester tries to access a FailedValue, it may throw an error creating a chain of errors tracing back to the original error.

FIGS. 13B-13I depict an example Suspendable Machine implemented as a computation loop in accordance with an embodiment.

Referring briefly to FIGS. 23A-23D, an example private dataflow variable implementation is depicted in accordance with an embodiment.

Referring briefly to FIGS. 24A-24D, an example semantic statement implementation is depicted in accordance with an embodiment.

Referring briefly to FIGS. 25A-25B, an example implementation of a value that can be bound to a private dataflow variable as a Boolean value in depicted in accordance with an embodiment.

FIG. 14 depicts a "Hello World!" example as expressed in a language, as described herein, paired with a concrete kernel language in accordance with an embodiment.

As discussed previously, Actorflow can coordinate multiple asynchronous requests and responses while also performing a computation service. The transfer of control between an actor construct and its suspendable machine may be communicated using return values, callbacks, and exceptions. The kernel language in FIG. 14 shows several example specialized callbacks to the actor construct: $RESPOND, $SPAWN, and $UNHANDLED. The $RES POND callback may correspond directly to the RESPONDING 1302 state in FIG. 13A, $S PAWN may be used to spawn a new concurrent actor, and $UNHANDLED may be invoked to signal an error when a message cannot be matched to a receive or respond handler.

Creating an actor value can be similar to creating a procedure value. Creating a procedure value may capture free variable references and produces a closure. Likewise, creating an actor value may capture free variable references and produce a closure.

The difference between a procedure value and an actor value may be seen when the value is applied to arguments. A procedure application may perform a computation by pushing its procedure statement onto the semantic stack with an environment containing bindings for the captured free variables and applied arguments. An actor application, on the other hand, may return an ActorConfig containing the closure and the applied arguments. Later, a spawn statement can be used to send the ActorConfig to a new actor instance. When constructing an ActorConfig, we may help ensure that the arguments are complete, and if an argument is not complete, a WaitException may be thrown, which can cause the computation loop to suspend but resume later when the waiting variable is bound.

To spawn an actor using an ActorConfig, the programmer can use the spawn keyword to invoke the $SPAWN callback in the actor instance. (See, e.g., line 9 of the language and line 14 of the kernel language in FIG. 14.) As an example, a parent actor construct may perform any or any combination of the following when invoked by the $SPAWN callback:

1. Can create a new environment for the child actor.
2. For each captured environment entry of the parent ActorConfig:
   a. If the captured environment entry references one of the built-in callbacks, can continue at step 2 with the next captured environment entry.
   b. If the captured environment entry reference is not complete, can throw a WaitException, which will cause the computation loop to suspend but resume later when the waiting variable is bound.
   c. If the captured environment entry reference is complete, can add the entry to the environment for the new child actor.
3. Can create a new child actor.
4. Can create a new closure for the child actor containing the child actor's root environment of built-ins and the new environment entries lifted in steps 2.a thru 2.c.
   a. Can send a Configure message to the new child actor with the new closure and applied arguments from the ActorConfig. This send operation may be safe across concurrency boundaries because the closure environment and applied arguments are complete and immutable.

When a child actor receives a Configure message, it may receive a closure and a list of arguments that were lifted from the parent actor. The child actor can configure itself by applying the closure to the list of arguments to produce a message handling statement. The message handling statement may be held for the life of the actor and can be used to process incoming messages.

Using FIG. 14 as an example:

Parent Actor: Line 13 in the Kernel Language can invoke the TalkingActor constructor and store the ActorConfig in the system generated variable $V0.

Parent Actor: Line 14 in the Kernel Language can invoke the $S PAWN callback, which can use the ActorConfig stored in $V0 to perform the spawning process described above. An actor reference to the spawned actor may be stored in the dataflow variable TalkingActorRef—can be used later to perform an ask at lines 20 and 21.

Child Actor: Line 4 in the Kernel Language can define a message handler procedure that can be held for the life of the child actor. Previously at FIG. 13A, we said, "The actor implementation for NumberService can compute an increment by pushing a semantic statement onto the semantic stack that performs the increment handler in the program from the computational loop." The phrase, "pushing a semantic statement onto the semantic stack," can refer to an apply statement constructed with this message handling procedure.

Constructing and spawning an actor may be performed in two steps. First, the parent actor may construct a complete and immutable ActorConfig using the free variables and closure defined within the child actor construct. Second, the ActorConfig may be sent to a new child actor where it can be used to construct a message handling procedure and wait for incoming messages.

Actorflow can support the notion of an "act" expression. Each act expression may be computed concurrently in a child actor. Although a programmer can accomplish the same task using actor constructs, the act expression may be more concise and streamlined. The example in FIG. 15A computes A=act B+C+act D+11 and and by delegating several nested calculations to a hierarchy of child actors. In the end, after substituting the nested calculations, we get 7+(7+5)+(5+11)=35.

When a parent actor receives the $ACT callback, it may create and spawn a child actor to compute the act expression as illustrated in FIG. 15B. Using FIG. 15B as an example, an actor may perform any or any combination of the following when it receives an $ACT callback:
1. Can create a new child actor.
2. Can create a list of free variables for the act assignment statement. In the example, the free variables are A, B, C, D, and $ACT.
3. Can create a new environment for the child actor.
4. For each free variable in the act assignment statement:
   a. If the free variable is the target of the act expression or one of the built-in callbacks, can continue at (4) with the next free variable. In the example, we will skip the free variables A and $ACT.
   b. If the free variable is unbound:
      i. Can add a bind listener using AddParentVarDependency( ) that will send a SyncVar message to the child actor when the free variable is finally complete.
      ii. Can add the entry (e.g., free identifier, new unbound child variable) to the child environment
   c. If the free variable is bound:
      i. If the free variable is complete, can add the entry (e.g., free identifier, complete value) to the child environment.
      ii. If the free variable is NOT complete:
         A. Can add a bind listener using AddParentVarDependency( ) to the unbound variable returned by the WaitException (e.g., can be thrown when checked for complete) that can send a SyncVar message to the child actor when the free variable is finally complete.
         B. Can add the entry (e.g., free identifier, new unbound child variable) to the child environment.
5. Can add a $RESPOND (A) statement to the act body.
6. Can create an ActRequest containing the extended act body, child environment.
7. Can send the ActRequest to the child actor with a request Id that helps us map the response. This send operation may be safe across concurrency boundaries because the ActRequest may only contain complete and immutable values, or new unbound child variables that may not be shared because they are completely relinquished to the child actor.

A child actor may perform any or any combination of the following when it receives an ActRequest:
1. Can set active-request to ActRequest.
2. Can create an initial environment using this actor's root environment and the incoming child environment.
3. Can push the act statement (the extended act body from step 6 above) onto the semantic stack.
4. Can perform the computation loop. This can be a transition from SCHEDULED 1202 to ACTIVE 1203 as discussed previously.
5. When the child actor receives the $RESPOND callback, can use the active-request setting to send a Response to the parent actor. This can be a transition to RESPONDING 1302 as discussed previously.

To complete an act, a parent actor may send input values to the child's waiting input variables. To facilitate this requirement, a parent actor may maintain for its lifetime a set of pairs WD where each element in WD is a mapping of T→D. T is a "trigger variable" and D is a set of triples of the form (P, C, CA) where P stands for "parent variable", C stands for "child variable", and CA stands for "child actor". Each element in WD may represent a waiting dependency where a child actor is waiting for an input value.

To satisfy the waiting dependencies, we can notify the parent actor from the computation loop when a trigger variable T is bound. This can be accomplished by setting a bind listener on the trigger variable. Because a dataflow variable may be owned and bound by a single actor, we can safely use a callback listener to notify the parent actor when a child dependency is bound to a value in the computation loop. There may be two procedures that maintain bind listeners: AddParentVarDependency( ) and OnParentVarBound( ).

The procedure AddParentVarDependency(T, P, C, CA) can add the new triple (P, C, CA) to D in the mapping T→D, wherein T is the trigger variable, P is the parent variable, C is the child variable, and CA is the child actor. In some embodiments, the procedure can use any or any combination of the following:
1. Can check WD for a current mapping T→D where D is the current set of dependency triples for T.
2. If a current mapping is found for T, can replace the mapping from T→D with T→D+((P, C, CA)) where the operation D+((P, C, CA)) adds the triple (P, C, CA) to the existing set of dependencies D.
3. If a current mapping is NOT found for T:
   a. Can add a new mapping entry T→((P, C, CA)) to WD.
   b. Can set a bind listener on T to notify the parent actor using OnParentVarBound( ) when T is bound to a value.

The procedure OnParentVarBound(T, Value) can be called when a trigger variable is bound to a value. In some embodiments, the procedure can use any or any combination of the following:
1. Can remove T→D from WD.
2. For each triple (P, C, CA) in D:
   a. The newly bound trigger variable can be either P or a component of P. There may be other unbound components of P, so can check if P is now complete.
      i. If P is complete, can send a SyncVar(C, complete-value) message to CA
      ii. If P is NOT complete, can let T2 equal the newly discovered waiting variable. In the embodiment, this can be the variable contained in the WaitException thrown when we checked for complete.
         A. Can check WD for a current mapping T2→D2 where D2 is the current set of dependency triples for T2.
         B. If a current mapping is found for T2→D2, can replace the mapping from T2→D2 with T2→D2+D where the operation D2+D is a union of the two sets into a new set of dependency triples. This operation can occur when the same unbound parent variable is needed concurrently by two different child actors.
         C. If a current mapping is NOT found for T2→D2:
            I. Can add a new mapping entry T2—((P, C, CA)) to WD.
            II. Can set a bind listener on T2 to notify the parent actor using OnParentVarBound( ) when T2 is bound to a value.

When a child actor receives a SyncVar(C, complete-value) message, it may push a semantic statement onto the semantic stack. The semantic statement can bind C to complete-value. If the child happens to be waiting on the variable C, it may now continue processing.

Thus, an "act" can be a single request-response interaction. The parent actor can create a single purpose child actor with its free variables as inputs. The child actor can run concurrently. If one or more of its inputs are unbound, it can wait for the completed values to arrive in SyncVar messages. Once the child actor is finished, the $RESPOND callback can send to the parent actor a result that can be subsequently bound to the result target in place of the original act expression.

Passing only immutable and complete messages between actors can be a tenet of the actor model. In Actorflow, passing only immutable and complete messages between actors can also help maintain privacy. Because message passing may not leak dataflow variables, the suspendable machine can hide the dataflow variables that it creates. As a result, the embodiment may not need to create an explicit container to hold dataflow variables. If needed, a transitive closure over the semantic stack can build a container of private dataflow variables.

Application programming can accept input, perform I/O and processing, and return an output. In contrast, concurrent application programming can be more complicated as it can accept input, distribute I/O and processing, compose results from the distributed I/O and processing, and return an output. The fork-join model and the split-apply-combine strategy are two examples that can show the extra steps that can be required by concurrent programming.

The idiomatic approach to concurrent programming can have two example processing phases:
1. Can distribute subtasks as concurrent processes that return intermediate data.
2. Can process the intermediate data returned by the concurrent processes into an output data.

In an example scenario that accepts a list of customer identifiers and returns a list of customer profiles, a single customer profile can contain three example data structures:
1. Basic customer data, such as name and address.
2. A list of the last ten customer orders.
3. A list representing the last six months of customer invoices.

The example process that retrieves and returns customer profiles can perform any or any combination of the following:
1. Can create an output list.
2. For each customer identifier:
   a. Can submit a concurrent task to retrieve the basic customer data.
   b. Can submit a concurrent task to retrieve the customer's last ten customer orders.
   c. Can submit a concurrent task to retrieve the customer's last six months of customer invoices.
   d. Can wait for the three concurrent tasks to complete
   e. Can create a customer profile containing the customer data, last ten customer orders, and last six months of customer invoices.
   f. Can add the customer profile to the output list.
3. Can return the output list to the requester.

Figure 17:

FIGS. 16 and 17 compare and contrast two different example programs 1600/1700 that implement the example scenario: in Java 1600 and in an embodiment as disclosed herein 1700.

The Java program 1600 in FIG. 16 can implement the example scenario: it can accept a list of customer identifiers, delegate I/O to three concurrent processes, and respond with a list of customer profiles. For each customer identifier the example Java program 1600 can do any or any combination of the following:
1. Submit a concurrent task to retrieve the basic customer data. The program variable customerFr can contain a reference to a Java CompletableFuture 1601.
2. Submit a concurrent task to retrieve the customer's last ten customer orders. The program variable lastTenOrdersFr can contain a reference to a Java CompletableFuture 1602.
3. Submit a concurrent task to retrieve the customer's last six months of customer invoices. The program variable sixMonthsHistoryFr can contain a reference to a Java CompletableFuture 1603.
4. Use the Java Completable Future.allOf( . . . ) expression to wait until we have data from all three subtasks: customerFr, lastTenOrdersFr, and sixMonthsHistoryFr 1604.
5. Create a customer profile using data from all three subtasks, can add the customer profile to profiles list 1605.
6. Return the profiles list to the requester 1606

The program 1700 according to the embodiments disclosed herein, in FIG. 17, can also implement the example scenario: it can accept a list of customer identifiers, delegate I/O to three concurrent processes, and respond with a list of customer profiles.

For each customer identifier, the program 1700 can do any or any combination of the following.
1. Create a customer profile data structure containing dataflow variables returned from three subtasks 1701: CustomerDao.ask(find #{customerId: CID}), CustomerOrderDao.ask(findLastTenOrders #{customerId: CID}), and CustomerInvoiceDao.ask(findSixMonthInvoiceHistory #{customerId: CID}).

2. Return the answer to the requester 1702.

Because the example program 1700 can use implicitly synchronized dataflow variables, the program code can embed values directly into data structures-whether they are bound or not.

Figure 18:
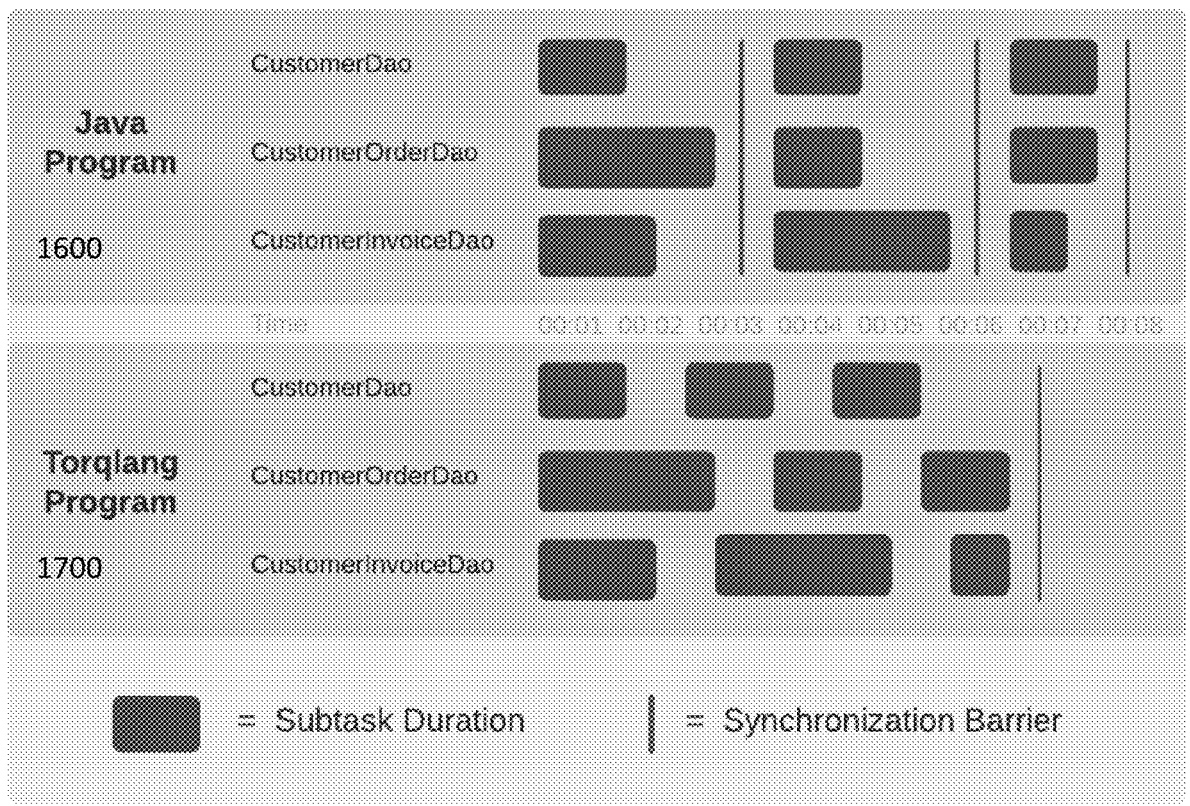
FIG. 18 illustrates the comparison between the implementations illustrated in FIGS. 16 and 17.

The example program 1700 may reduce overall latency compared to the Java program 1600 by, for example, reducing the number of synchronization barriers used for join points. As illustrated in FIG. 18, each barrier for the Java program 1600 can correspond to the CompletableFuture.allOf( . . . ) expression 1604 in Java program 1600. The barrier for the program 1700 can correspond to the response expression Answer.toTuple( ) 1702.

In this particular example, the program 1700 can increase concurrency because it builds a complete list of customer profiles with embedded values, bound or not. This can allow the Data Access Objects (DAOs) to work independently and unencumbered to complete all of their subtasks. Only at the end of the respond handler may the program need to enforce a synchronization barrier. In contrast, the Java program may need to synchronize more often because it cannot embed a CompleteableFuture as a value in a customer profile.

Figure 19:
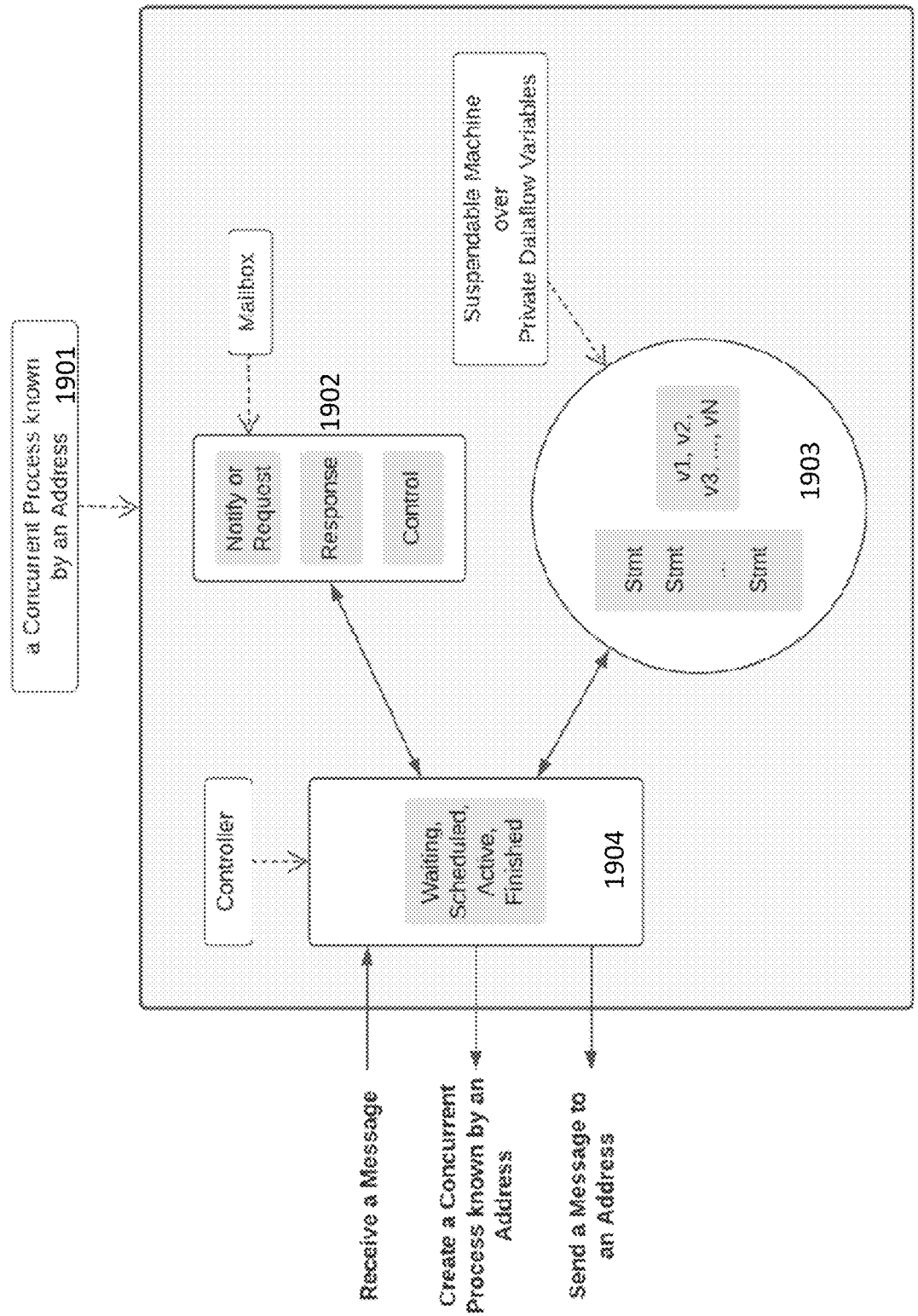
FIG. 19 illustrates a structural view of a concurrent process in accordance with an embodiment.

FIG. 19 illustrates a structural view of a concurrent process 1901 in accordance with an embodiment. In some embodiments, a language can be used to implement one or more actors in a system of communicating actors, such as the system illustrated in FIG. 5B. An actor 1901 implemented, as described herein, can be a concurrent process known by an address that may contain a controller 1904, a mailbox 1902, and a suspendable machine 1903 that computes over private dataflow variables. While concurrently computing, each actor 1901 can asynchronously send messages to other actors and/or create and spawn new actors.

Figure 20:
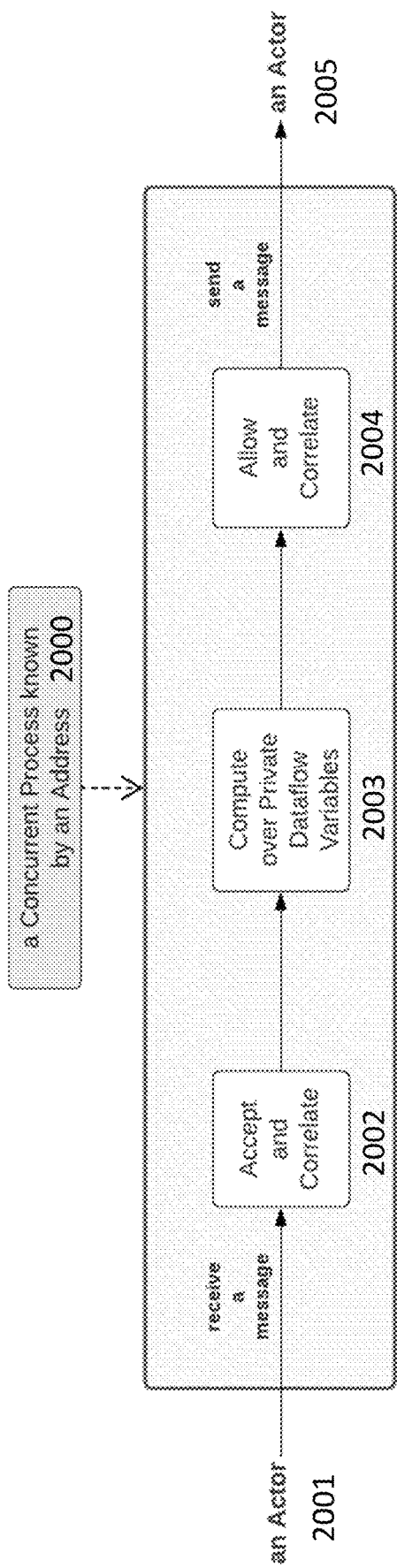
FIG. 20 illustrates a processing overview in accordance with an embodiment.

FIG. 20 illustrates a processing overview in accordance with an embodiment. A process 2000 can receive a message from another actor 2001. The actor 2001 may or may not be implemented within the embodiments described herein.

Received messages can be accepted and correlated 2002. If multiple messages exist in the mailbox, the process 2000 can choose control messages before any other, and/or response messages before notify or request messages. When multiple messages of the same type are chosen, other ordering methods can be used such as first in first out (FIFO).

A response can contain the original request identifier. Using the request identifier, a response value can be bound according to its request type. For example, a request for a single value can be bound to a single dataflow variable, or a request for a stream of values can be bound to a stream of dataflow variables.

Computation 2003 can proceed until preempted, suspended, or finished. If any unbound dataflow variable is needed, computation 2003 can be suspended. Later, when an unbound dataflow variable is bound by a response, computation 2003 can resume.

Outgoing messages can be allowed and correlated 2004. Outgoing messages can be checked for completeness. If incomplete, a wait-exception can be raised causing computation to wait until complete. Completeness can be enforced when sending a message for existing actors, performing acts, or spawning new actors.

A request can be sent with a request identifier that is returned as part of the response. A request identifier can be associated with a request type and response target. For example, computation can request a single response value and target a single dataflow variable, or it can request a stream of response values and target a stream of dataflow variables.

A process 2000 can send a message to another actor 2005, which may or may not be the messaging actor 2001. The actor 2005 may or may not be implemented within the embodiments described herein.

Figure 21:
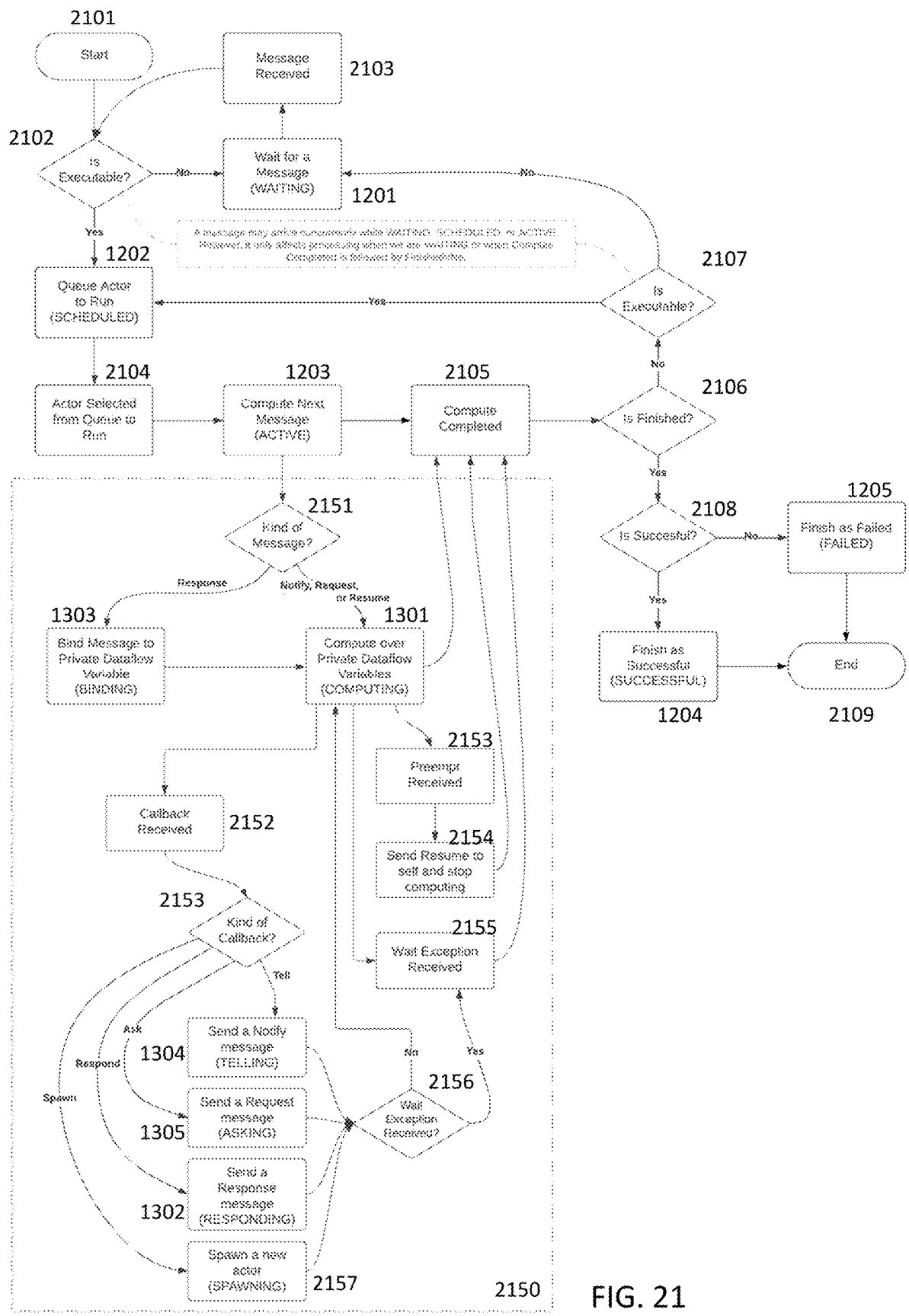
FIG. 21 illustrates a process, in a flowchart, in accordance with an embodiment.

FIG. 21 illustrates a process, in a flowchart, in accordance with an embodiment. A newly spawned process 2101 can start with a received message. The process can determine if the message is executable 2102. Responsive to the message not being executable, the process can transition to WAITING 1201 until a new message is received 2103.

Responsive to the message being executable, the process can transition to SCHEDULED 1202. An actor from the queue can be selected 2104 to run based on one or more rulers (e.g., the rules disclosed in reference to FIG. 20). A selected actor can be transitioned to ACTIVE 1203. Computing can then be performed in the suspendable machine 2150. Based on the kind of message 2151, the process may transition to BINDING 1303 (e.g., if the message is a response). With private dataflow variables bound, if necessary, the process can transition to COMPUTING 1301.

During COMPUTING 1301 a callback can be received 2152. Based on the kind of callback 2153 (e.g., TELLING 1304, ASKING 1305, RESPONDING 1302, or SPAWNING 2157) a message will be produced for another actor. The messaging with another actor can require a wait exception. A determination can be made on a wait exception 2156. If a wait exception is not received the process can continue COMPUTING 1301. If a wait exception is received computing ends 2105.

During COMPUTING 1301 a preempt can be received 2153. The actor can send a resume to itself 2154 and stop computing 2105.

During COMPUTING 1301, the message can be fully computed, and the process can stop computing 2105.

The process can determine if the message is fully computed 2106. If the message requires further computation, the actor can be transitioned SCHEDULED 1202 WAITING 1201 based on the executability 2107 of the message. If the message is fully computed, the process can determine if the computation was successful 2108 and transition the process to SUCCESSFUL 1204 or FAILED 1205. A transition to SUCCESSFUL 1204 or FAILED 1205 may end the process 2109.

Figure 22:
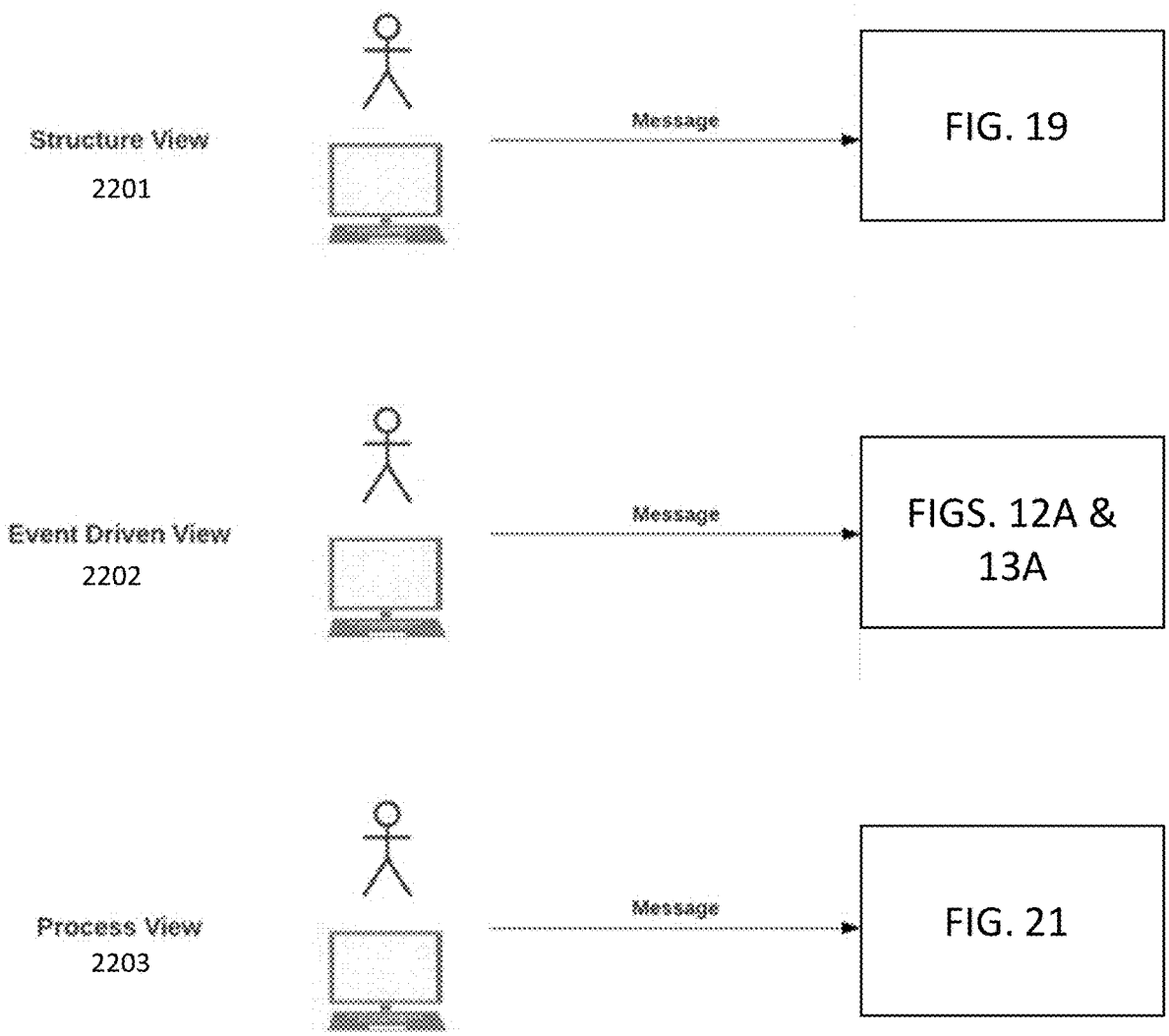
FIG. 22 illustrates a user experience in accordance with an embodiment.

FIG. 22 illustrates the user experience in accordance with an embodiment. A concurrent process can be invoked when another process sends a message to an actor as previously illustrated in the Structure View 2201 of FIG. 19, the Event-Driven View 2202 of FIGS. 12 and 13, and the Process View 2203 of FIG. 21. The Event-Driven View 2202 and Process View 2203 illustrate "waiting for a message," which can be the interaction point that receives a message. The Event-Driven View 2202 and Process View 2203 can use capitalized labels to correlate behavior between the figures.

A person of ordinary skill in art will understand that the word "suspend" in this document may mean waiting to select a message as opposed to waiting for a private dataflow variable.

The following background references are incorporated herein in their entireties:
1) Agha, G. A. (1985). Actors: A model of concurrent computation in distributed systems. Massachusetts Inst of Tech Cambridge Artificial Intelligence Lab.

2) Ahman, D., & Pretnar, M. (2021). Asynchronous effects. Proceedings of the ACM on Programming Languages, 5(POPL), 1-28.
3) Bravo, M., Li, Z., Van Roy, P., & Meiklejohn, C. (2014, September). Derflow: distributed deterministic dataflow programming for Erlang. In Proceedings of the Thirteenth ACM SIGPLAN workshop on Erlang (pp. 51-60).
4) Dijkstra, E. W. (1968). Letters to the editor: go to statement considered harmful. Communications of the ACM, 11(3), 147-148.
5) Kambona, K., Boix, E. G., & De Meuter, W. (2013, July). An evaluation of reactive programming and promises for structuring collaborative web applications. In Proceedings of the 7th Workshop on Dynamic Languages and Applications (pp. 1-9).
6) Lea, D. (2000, June). A java fork/join framework. In Proceedings of the ACM 2000 conference on Java Grande (pp. 36-43).
7) Lee, E. A. (2006). The problem with threads. Computer, 39(5), 33-42.
8) Leger, P., Fukuda, H., & Figueroa, I. (2021). Continuations and Aspects to Tame Callback Hell on the Web. Journal of Universal Computer Science, 27(9), 955-978.
9) Mikkonen, T., & Taivalsaari, A. (2008, August). Web applications-spaghetti code for the 21st century. In 2008 Sixth international conference on software engineering research, management and applications (pp. 319-328). IEEE.
10) Nyman, L., & Laakso, M. (2016). Notes on the History of Fork and Join. IEEE Annals of the History of Computing, 38(3), 84-87.
11) Osborne, G., & Weninger, T. (2016, June). Ozy: a general orchestration container. In 2016 IEEE International Conference on Web Services (ICWS) (pp. 609-616). IEEE.
12) Sutter, H. (2005). The free lunch is over: A fundamental turn toward concurrency in software. Dr. Dobb's journal, 30(3), 202-210.
13) Sutter, H., & Larus, J. (2005). Software and the Concurrency Revolution: Leveraging the full power of multicore processors demands new tools and new thinking from the software industry. Queue, 3(7), 54-62.
14) Van-Roy, P., & Haridi, S. (2004). Concepts, techniques, and models of computer programming. MIT press.
15) Wickham, H. (2011). The split-apply-combine strategy for data analysis. Journal of statistical software, 40(1), 1-29.
16) https://akka.io/—the home page for Akka, a toolkit for building concurrent, distributed, message passing applications. This website was accessed Jan. 16, 2022.
17) https://www.erlang.org/—the home page for Erlang, a programming language and middleware for building concurrent, distributed, message passing applications. This website was accessed Jan. 16, 2022.
18) https://docs.oracle.com/en/java/javase/11/docs/api/java.base/java/util/concurrent/Comp letableFuture.html—the Java CompletableFuture object. This website was accessed Jan. 16, 2022.
19) http://www.jpaulmorrison.com/cgi-bin/wiki.pl?CoordinationLanguage—This website was accessed Jan. 31, 2022.
20) https://www.coursera.org/lecture/parallel-programming-in-java/phaser-exanples-vs3XJ—Parallel Programming in Java; Data flow Synchronization and Pipelining using the Java Phaser class. This website was accessed Jan. 16, 2022.
21) https://en.wikipedia.org/wiki/Coupling_(computer_programming)—This website was accessed Jan. 31, 2022.
22) https://en.wikipedia.org/wiki/Dataflow_programming—This website was accessed Jan. 31, 2022.
23) https://en.wikipedia.org/wiki/Flow-based_programming—This website was accessed Jan. 31, 2022.
24) https://en.wikipedia.org/wiki/Linda_(coordination_language)—This website was accessed Jan. 31, 2022.
25) https://en.wikipedia.org/wiki/Service-oriented_architecture—This website was accessed Jan. 31, 2022.

While the present disclosure has been illustrated by the description of exemplary embodiments thereof, and while the embodiments have been described in certain detail, the Applicant does not intend to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:
1. A process, comprising:
selecting an electronic message to process, by a controller, wherein the controller selects a response message before a notify or request message;
suspending the process when the controller cannot select a message for processing;
invoking a suspendable machine to compute a selected message, wherein the controller creates an environment containing callbacks to the controller, and wherein the controller pushes a message handling semantic statement onto the suspendable machine;
suspending computing of the selected electronic message in response to the controller receiving a communication from the suspendable machine that the suspendable machine requires one or more unbound private dataflow variables;

resuming the computing of the selected electronic message in response to the controller selecting an electronic message that can bind at least one of the one or more unbound private dataflow variables;

sending an asynchronous message to an address of a process when the controller receives a communication from the suspendable machine, wherein the controller ensures that a message is complete with no unbound private dataflow variables, wherein the controller suspends the process if a message contains unbound private dataflow variables;

creating a concurrent process known by the address when the controller receives a communication from the suspendable machine;

concurrently receiving a message into a mailbox while the process is computing; and computing, by the suspendable machine over private dataflow variables, wherein the suspendable machine communicates with the controller by invoking a callback or exiting with a return value, and communicates with the controller to cause the process to suspend and wait for a private dataflow variable.

2. The process of claim 1, wherein the controller selects a control message before other types of messages.

3. The process of claim 1, wherein the suspendable machine contains a stack.

4. The process of claim 1, wherein the suspendable machine contains a tree.

5. The process of claim 1, wherein the controller creates the concurrent process with free variables.

6. The process of claim 1, wherein the controller sends a message to the concurrent process when a free variable becomes bound.

7. The process of claim 1, wherein the concurrent process sends a response to the controller when computing is finished.

8. A system, comprising:
a processor configured for:
selecting an electronic message to process, by a controller, wherein the controller selects a response message before a notify or request message;

suspending processing when the controller cannot select a message for processing;

invoking a suspendable machine to compute a selected message, wherein the controller creates an environment containing callbacks to the controller, and wherein the controller pushes a message handling semantic statement onto the suspendable machine;

suspending computing of the selected electronic message in response to the controller receiving a communication from the suspendable machine that the suspendable machine requires one or more unbound private dataflow variables;

resuming the computing of the selected electronic message in response to the controller selecting an electronic message that can bind at least one of the one or more unbound private dataflow variables;

sending an asynchronous message to an address of a process when the controller receives a communication from the suspendable machine, wherein the controller ensures that a message is complete with no unbound private dataflow variables, wherein the controller suspends the process if a message contains unbound private dataflow variables;

creating a concurrent process known by the address when the controller receives a communication from the suspendable machine;

concurrently receiving a message into a mailbox while the process is computing; and computing, by the suspendable machine over private dataflow variables, wherein the suspendable machine communicates with the controller by invoking a callback or exiting with a return value, and communicates with the controller to cause the process to suspend and wait for a private dataflow variable.

9. The system of claim 8, wherein the controller selects a control message before other types of messages.

10. The system of claim 8, wherein the suspendable machine contains a stack.

11. The system of claim 8, wherein the suspendable machine contains a tree.

12. The system of claim 8, wherein the controller creates the concurrent process with free variables.

13. The system of claim 8, wherein the controller sends a message to the concurrent process when a free variable becomes bound.

14. The system of claim 8, wherein the concurrent process sends a response to the controller when computing is finished.

* * * * *